US011942005B2

(12) United States Patent
Nygård et al.

(10) Patent No.: US 11,942,005 B2
(45) Date of Patent: Mar. 26, 2024

(54) SENSOR LABEL PRINTER AND SENSOR LABEL FEEDER

(71) Applicant: Tive Tag Norway AS, Mo I Rana (NO)

(72) Inventors: Knut Nygård, Mo I Rana (NO); Jon Neeraas, Nesna (NO)

(73) Assignee: Tive Tag Norway AS, Mo I Rana (NO)

( * ) Notice: Subject to any disclaimer, the term of this patent is extended or adjusted under 35 U.S.C. 154(b) by 689 days.

(21) Appl. No.: 17/057,564

(22) PCT Filed: May 2, 2019

(86) PCT No.: PCT/NO2019/050099
§ 371 (c)(1),
(2) Date: Nov. 20, 2020

(87) PCT Pub. No.: WO2019/226052
PCT Pub. Date: Nov. 28, 2019

(65) Prior Publication Data
US 2021/0201704 A1     Jul. 1, 2021

(30) Foreign Application Priority Data

May 22, 2018   (NO) .................................. 20180712

(51) Int. Cl.
*B41J 3/407* (2006.01)
*B65C 9/18* (2006.01)
(Continued)

(52) U.S. Cl.
CPC .......... *G09F 3/0297* (2013.01); *B41J 3/4075* (2013.01); *B65C 9/1892* (2013.01); *B65C 11/02* (2013.01);
(Continued)

(58) Field of Classification Search
CPC . B41J 3/4075; B41J 11/58; B41J 29/00; B41J 29/023; B41J 29/026; B41J 29/02;
(Continued)

(56) References Cited

U.S. PATENT DOCUMENTS 4,759,484 A   7/1988 Richter
5,829,898 A   11/1998 Hill et al.
(Continued)

FOREIGN PATENT DOCUMENTS

DE   2219077 A1   10/1973
JP   62119346      7/1987
(Continued)

OTHER PUBLICATIONS

Response to Extended European Search Report dated Feb. 3, 2022 for European Application No. 19807913.9; Response filed Aug. 30, 2022; 67 Pages.
(Continued)

*Primary Examiner* — Kristal Feggins
(74) *Attorney, Agent, or Firm* — DALY, CROWLEY, MOFFORD & DURKEE, LLP

(57) ABSTRACT

Present invention comprise sensor label, printer assembly, method and system for production and initializing the sensor label, and a method for monitoring the temperature chain of a transport session with goods under transport and/or storage.

4 Claims, 32 Drawing Sheets

(51) Int. Cl.
| | |
|---|---|
| *B65C 11/02* | (2006.01) |
| *G01K 1/022* | (2021.01) |
| *G01K 1/024* | (2021.01) |
| *G06K 19/07* | (2006.01) |
| *G09F 3/00* | (2006.01) |
| *G09F 3/02* | (2006.01) |

(52) U.S. Cl.
CPC .............. *G01K 1/022* (2013.01); *G01K 1/024* (2013.01); *G06K 19/0717* (2013.01); *G06K 19/0723* (2013.01); *G09F 3/0286* (2013.01); *G09F 2003/0201* (2013.01)

(58) Field of Classification Search
CPC ..... B65C 9/1892; B65C 11/02; G09F 3/0297; G09F 3/0286; G09F 2003/0201; G01K 1/024; G01K 1/022; G01K 2207/04; G01K 1/026; G06K 19/0717; G06K 19/0776; G06K 19/0723
See application file for complete search history.

(56) References Cited

U.S. PATENT DOCUMENTS

| | | | | |
|---|---|---|---|---|
| 2003/0146943 | A1* | 8/2003 | Lehmkuhl | ............... B41J 29/02 347/9 |
| 2003/0227528 | A1 | 12/2003 | Hohberger | |
| 2006/0082446 | A1 | 4/2006 | Dods | |
| 2008/0024278 | A1 | 1/2008 | Volpi et al. | |
| 2009/0027213 | A1 | 1/2009 | Debord et al. | |
| 2009/0166405 | A1 | 7/2009 | Skaistis et al. | |
| 2009/0174139 | A1* | 7/2009 | Chen | ..................... B41J 3/4075 271/278 |
| 2013/0133824 | A1 | 5/2013 | Kian et al. | |
| 2017/0229000 | A1 | 8/2017 | Law | |
| 2020/0087015 | A1* | 3/2020 | Stern | ..................... B41J 11/703 |

FOREIGN PATENT DOCUMENTS

| | | |
|---|---|---|
| JP | 2006004150 | 1/2006 |
| JP | 2007237565 | 9/2007 |
| JP | 2008272988 | 11/2008 |
| JP | 2009159240 A | 7/2009 |
| JP | 5063317 | 10/2012 |

OTHER PUBLICATIONS https://web.archive.org/web/20180324104831/https://tag-sensors.com/ Page saved by the internet archive Mar. 24, 2018; 7 pages.
PCT/NO2019/050099; International Search Report; dated Sep. 16, 2019; 15 pages.
PCT/NO2019/050099; International Preliminary Report on Patentability; dated Apr. 14, 2020; 40 pages.
"ROLLO Label Holder for Rolls and Fan-Fold Labels", Amazon.co.uk: Office Products, Available Online at: https://www.amazon.in/ROLLO-Label-Holder-Fan-Fold-Labels/dp/B071NGQC57, Accessed from internet on Dec. 12, 2020, 5 pages.
"Tag Sensors", Available Online at: https://web.archive.org/web/20180118173143/http://tag-sensors.com:80/, Jan. 18, 2018, 6 pages.
Application No. NO20200570, Office Action, dated Dec. 12, 2020, 5 pages.
European Intention to Grant dated Feb. 1, 2023 for European Application No. 19807913.9; 63 Pages.
Application No. EP19807913.9, Extended European Search Report, dated Feb. 3, 2022, 11 pages.

* cited by examiner

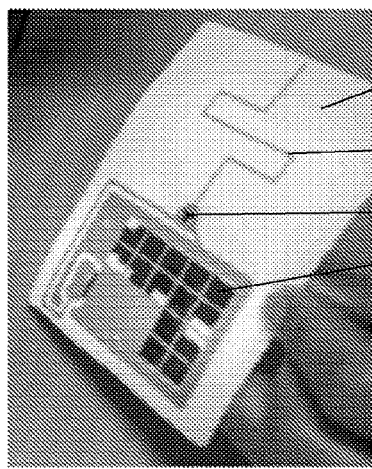
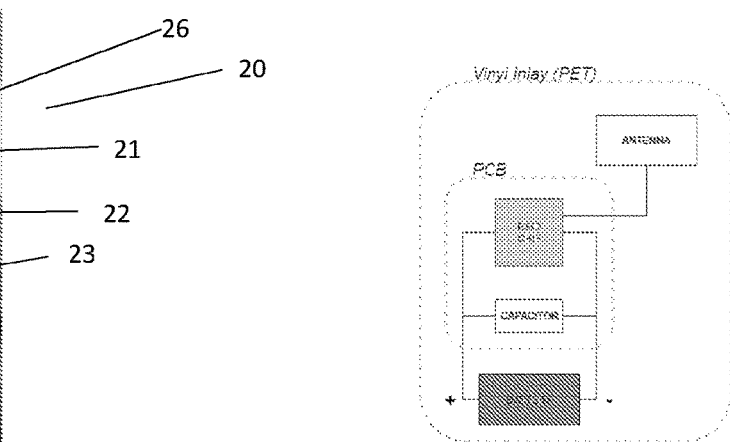
Fig. 2C
Fig. 2A
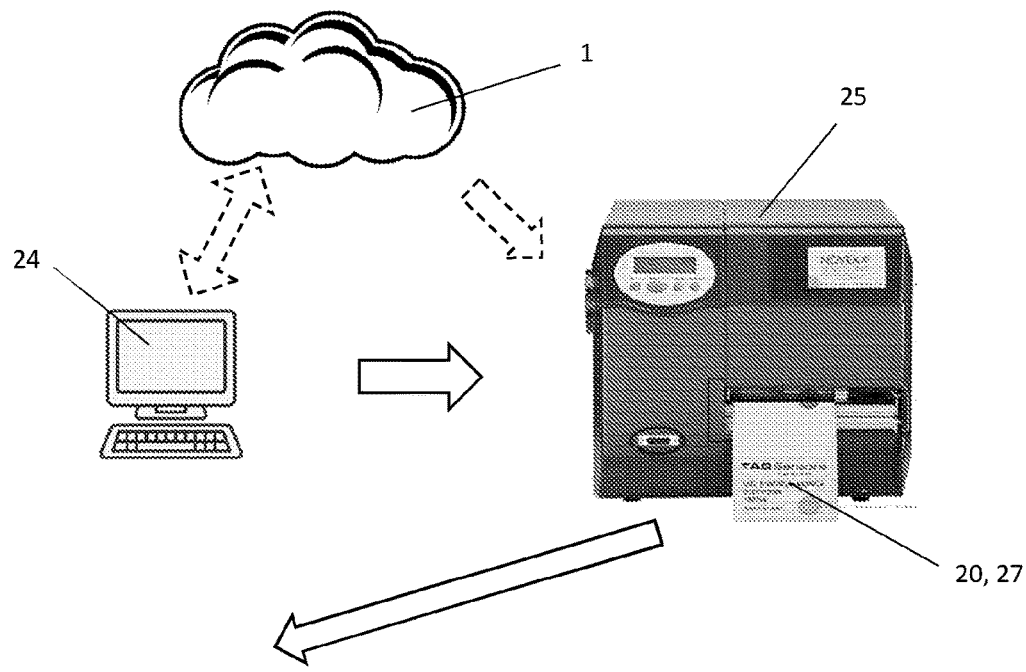
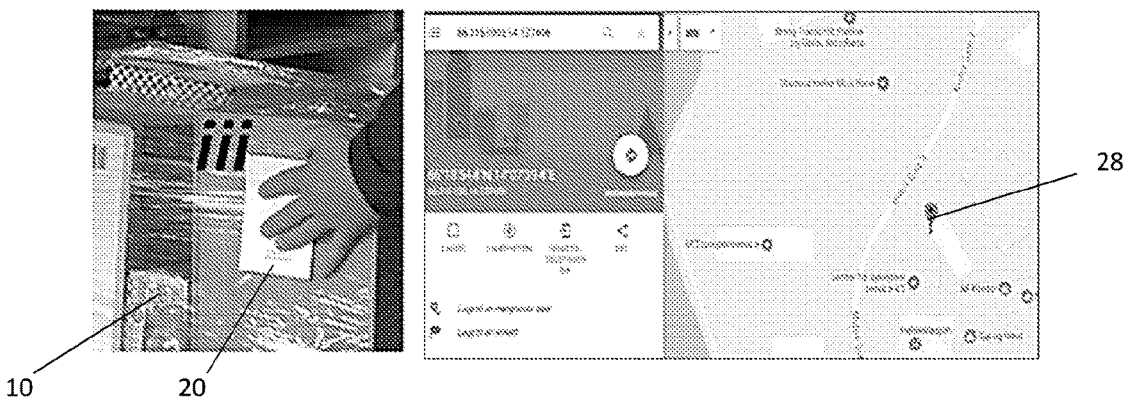
Fig. 2B

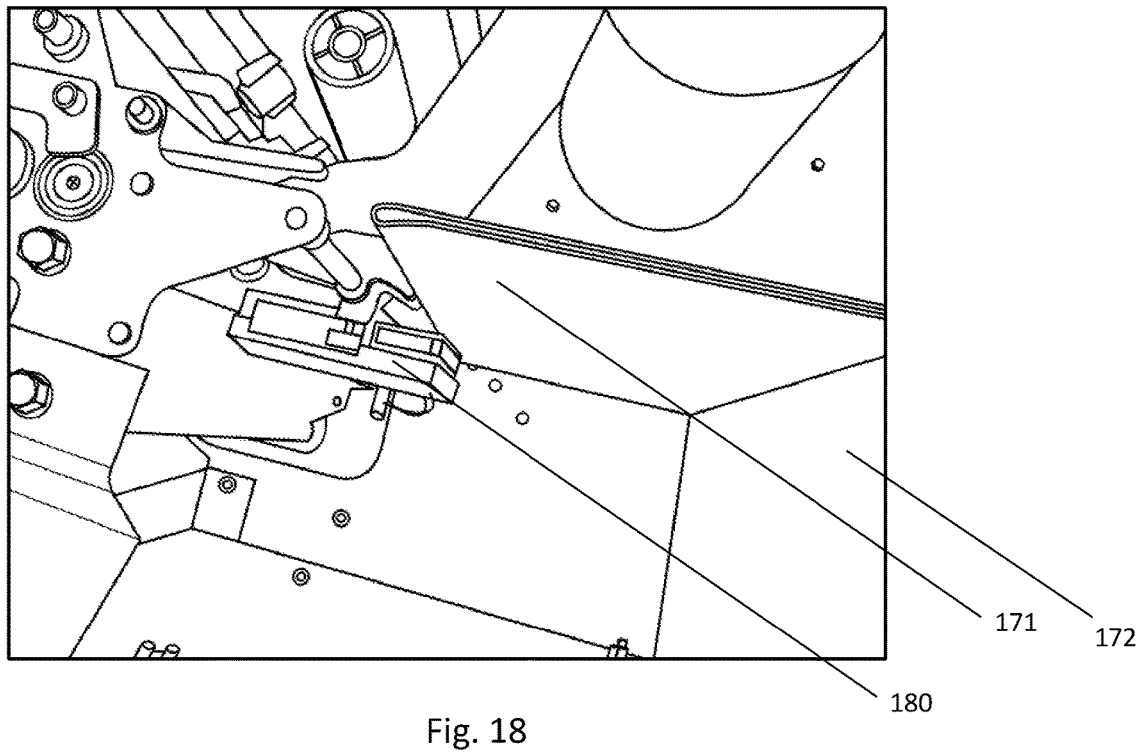
Fig. 18
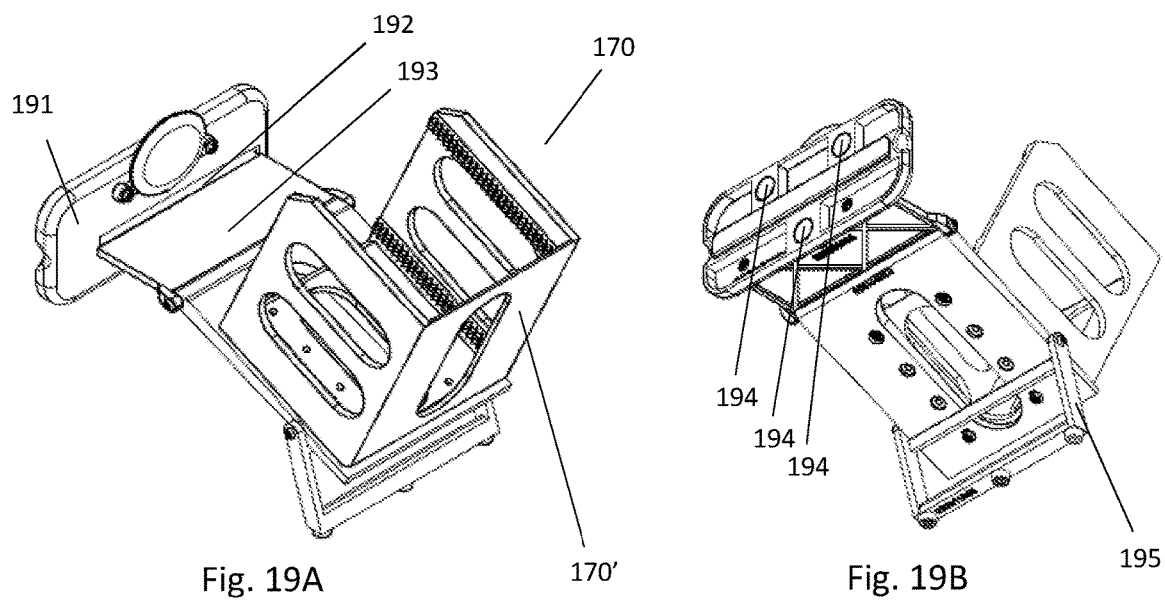
Fig. 19A
Fig. 19B

SENSOR LABEL PRINTER AND SENSOR LABEL FEEDER

Present invention comprise a sensor label, printer assembly, method and system for production and initializing the sensor label, and a method for monitoring the temperature chain of a transport session with goods under transport and/or storage.

There is considerable challenges and problems encountered in all transport and storage of temperature sensitive goods. Whether it is transport and storage of food for human consumption or other goods, for example organ transport, medicine, chemicals or other.

One third of food produced for human consumption globally, 1.3 bn tons per year, is lost or wasted, and a part of this waste is due to mishandled cold chain management of the food under transport and storage. For example, a brief exposure of food to a temperature of 4° C. to 60° C. can allow bacteria such as Staphylococcus, Salmonella or E-coli to reach harmful levels.

The food production industries have high carbon footprint, such as meat production. Therefore, the waste of food due to cold chain mismanagement also leads to unnecessary $CO_2$ pollution.

High volume distributors & logistic operators are normally the ones most vulnerable to inefficient cold chain monitoring and management solutions. Producers, retailers, authorities or end-consumer requires them, to provide documentation on their food handling, transport and processing, wherein cold chain documentation is one vital part.

Additionally major logistic players are often sub-contracting to third parties, parts of or complete sections of the distribution, geographically or by line of goods. Therefore, it is an increasing problem to be able to control all cold chain behavior efficiently, and to guarantee fulfilment of the quality requirements from producers, retailers, authorities or end-consumer.

Currently available methods for temperature logging often does not meet regulatory requirements and/or individual company quality requirements for food transportation. Logging individual sensitive products from production to consumption is currently a costly and inefficient process. Existing temperature loggers are medium to high cost devices, unsuitable for a proper degree of automation since they often are manually operated and best applied to bulk entities. The problem arise when individual packages of goods are taken out of a monitored environment.

Further problems are related to inability for flexible and customizable logging regime, and the inability to recognize individual handling requirements for small size packages.

The high dependency on manual labor concerned with initializing, marking and logging cold chain operation increase the barrier for using known techniques to smaller size and lower value transport entities.

It is the aim of the present invention to provide a system, method and device that solve some or all of the above highlighted problems.

It is provided a temperature sensor embedded in a low cost highly individual adaptable sensor label, having a very light and thin format.

It is further provided a management system able to individually configure, monitor and report/manage data logged by the individual sensor label.

It is further provided a cloud based service for data management and sharing.

It is further provided a unique automation process for configuring, initializing, defining operation regime for, printing and implementing the temperature sensor label of present invention.

A dedicated printer comprising unique features is also provided.

According to the present invention, the objective is reached by a thin film sensor label comprising a temperature sensor communicating with a computing means as defined by the features in the independent claim 1. Further advantageous or alternative embodiments are given in the dependent claims.

So that the manner in which the above recited features of the present disclosure can be understood in detail, a more particular description of the disclosure, briefly summarized above, may be had by reference to embodiments. The accompanying drawings relate to embodiments of the disclosure and are described in the following:

FIG. 2A illustrate an embodiment of the sensor label layout

Figure 3:
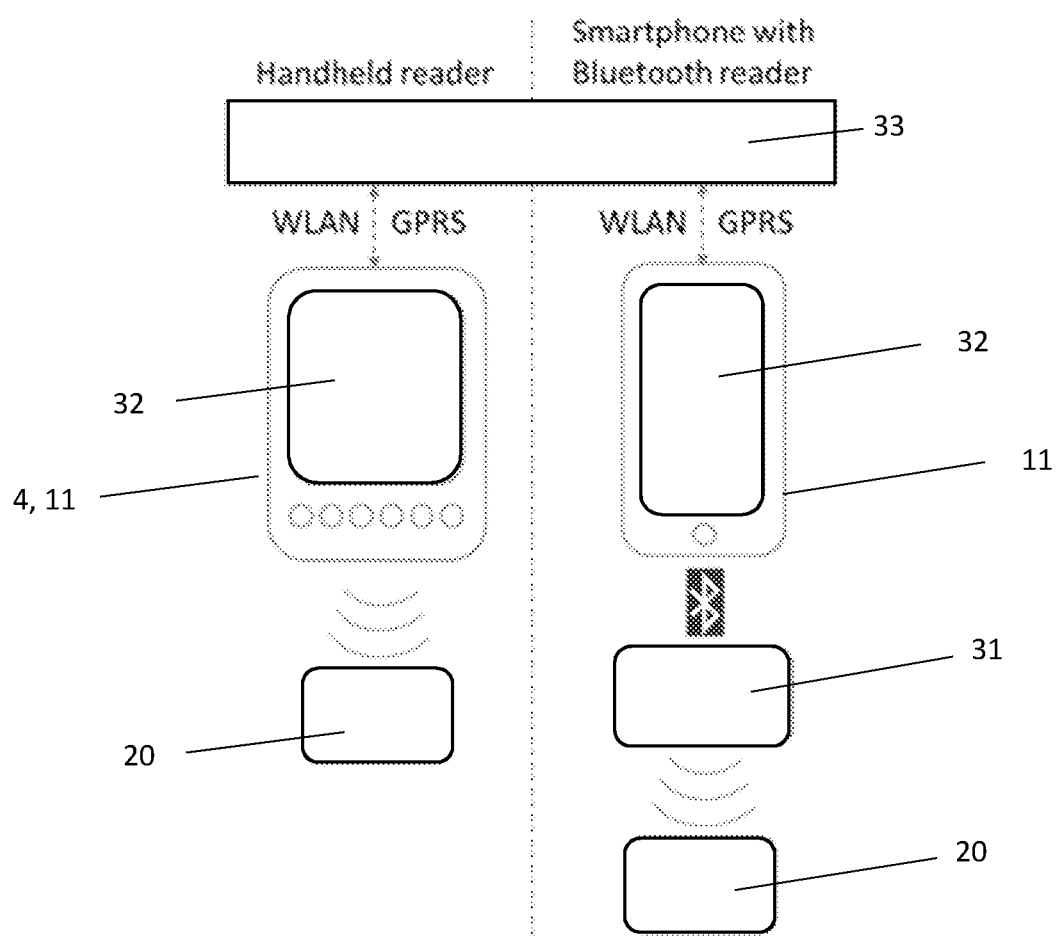
Figure 4:
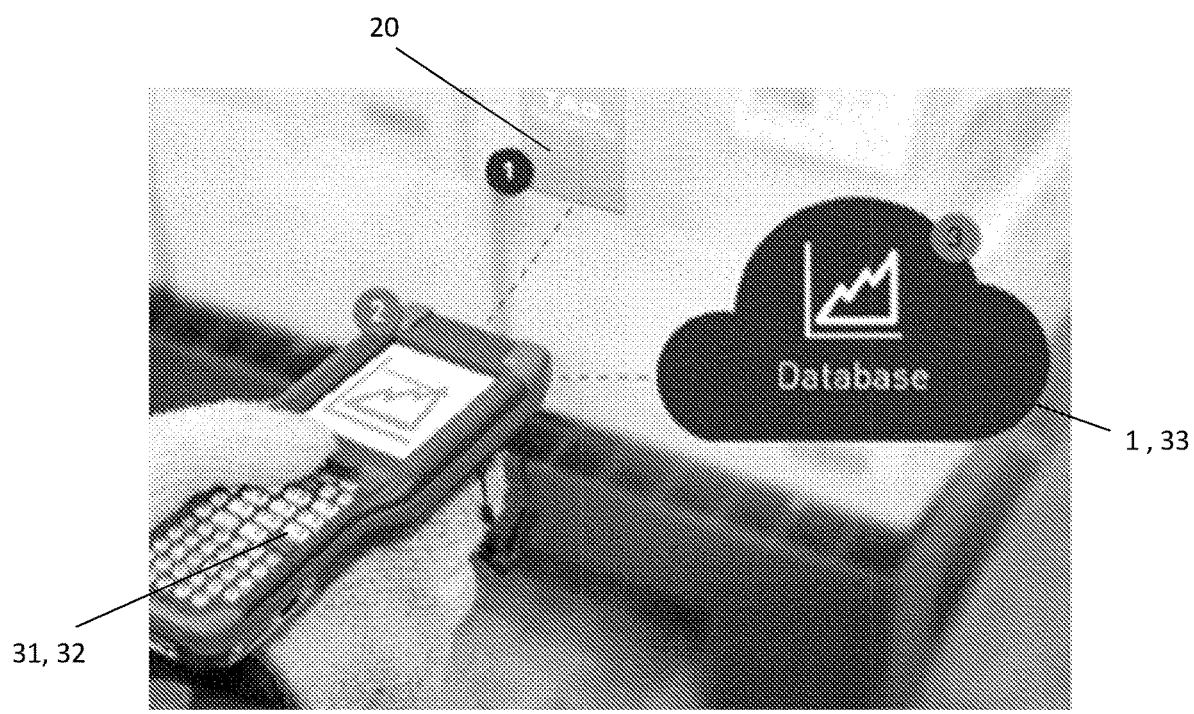
Figure 5:
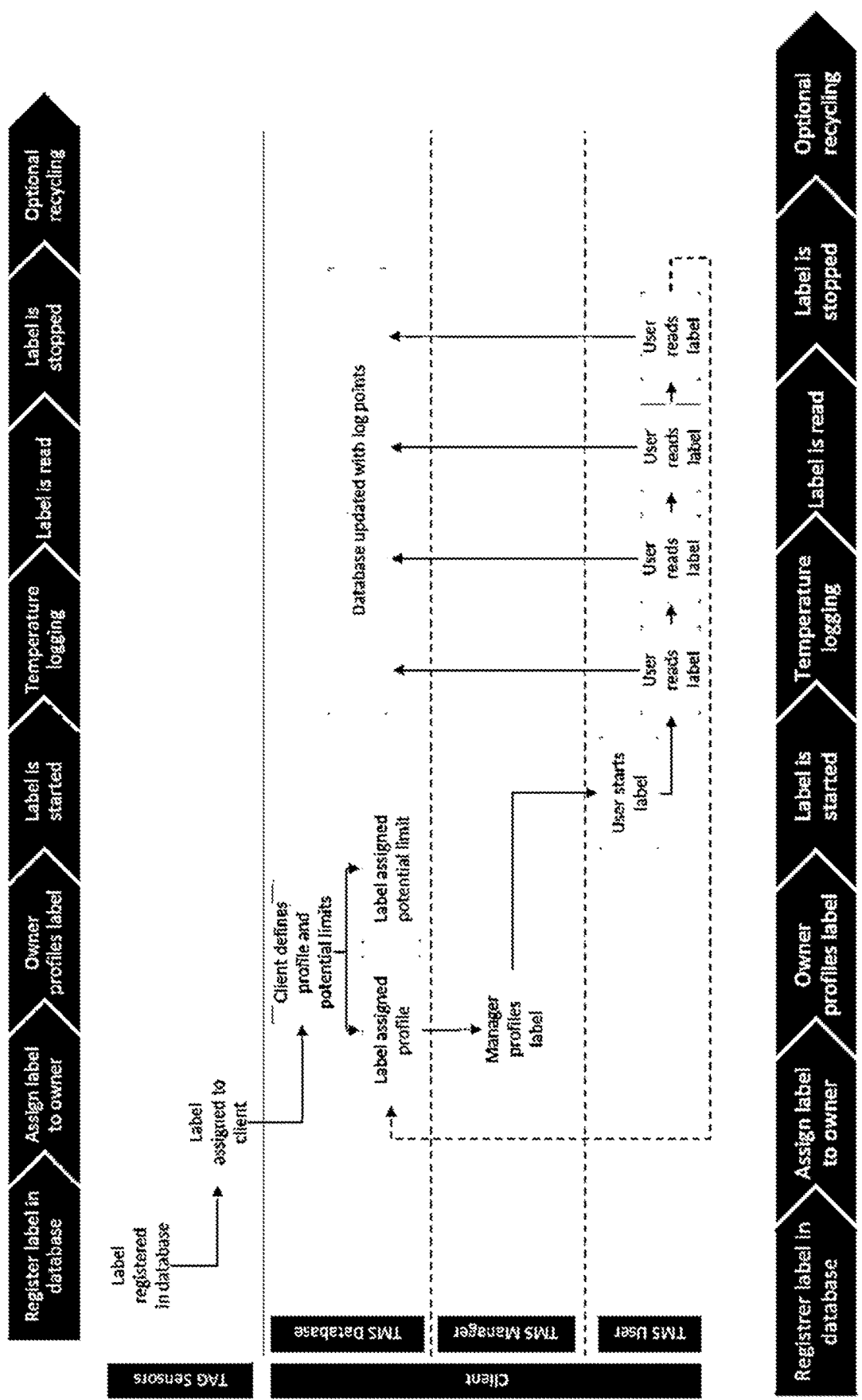
Figure 6A:
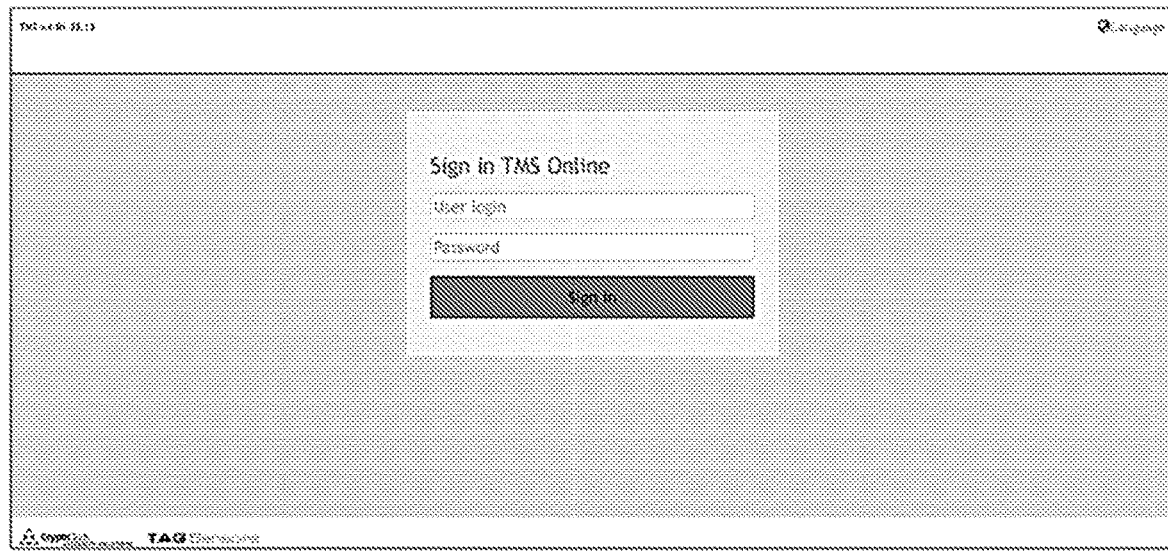
Figure 6B:
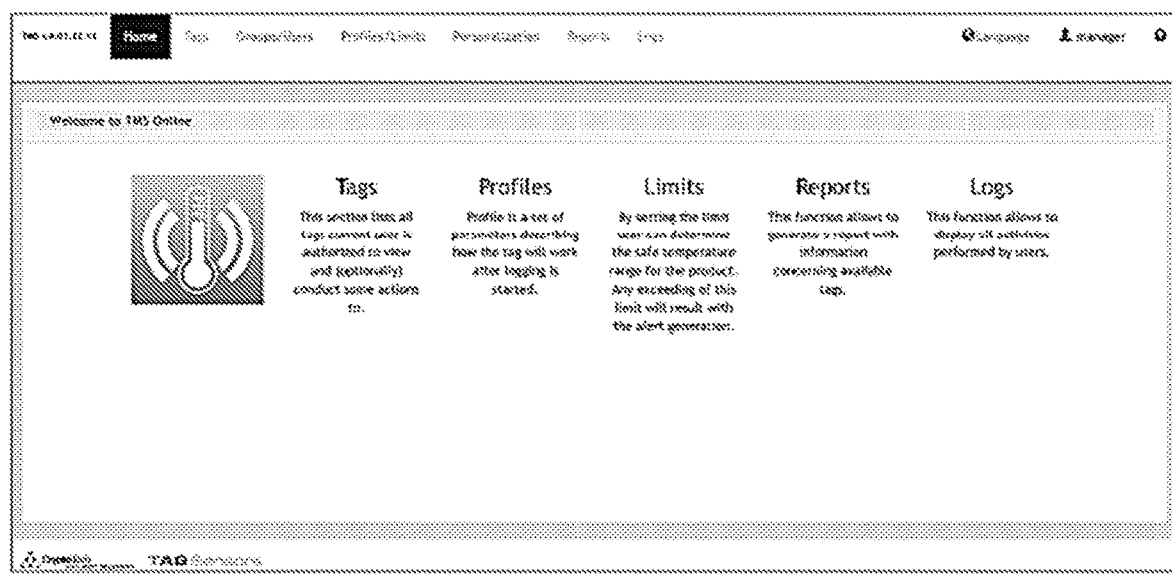
Figure 7B:
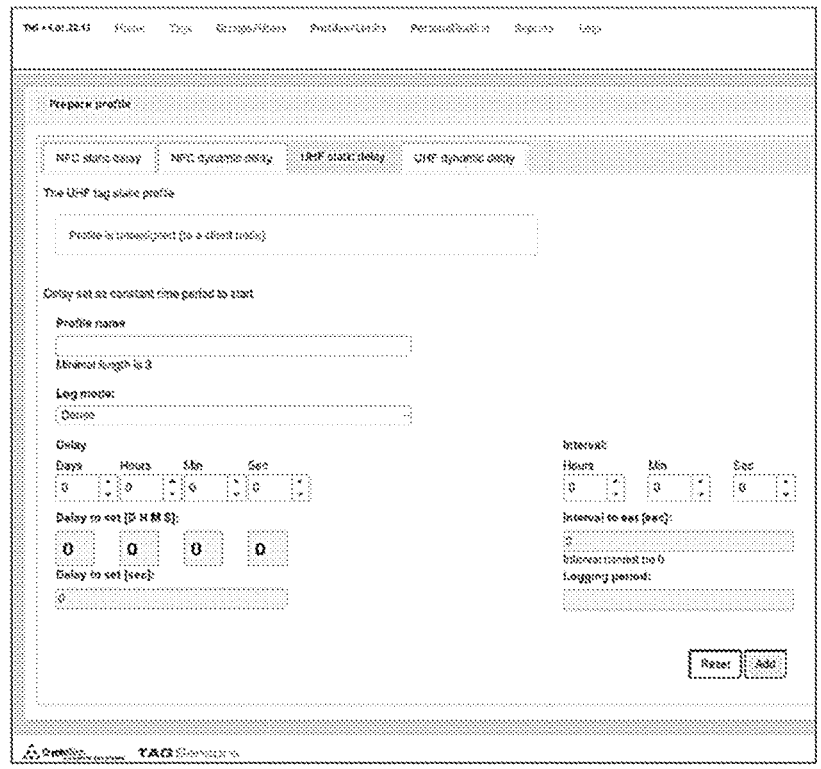
Figure 7C:
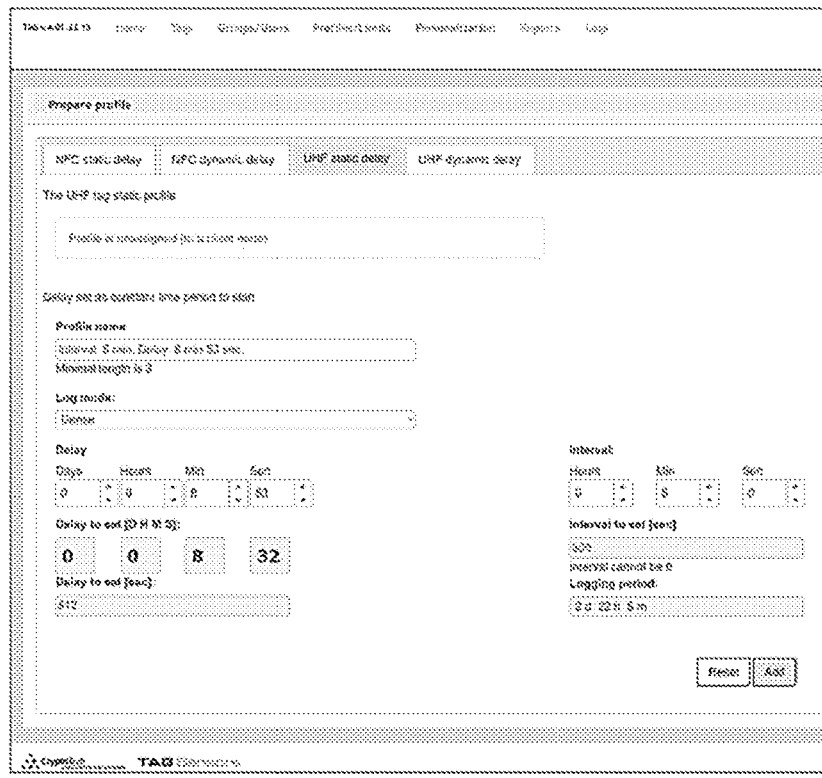
Figures 7D, 8A:
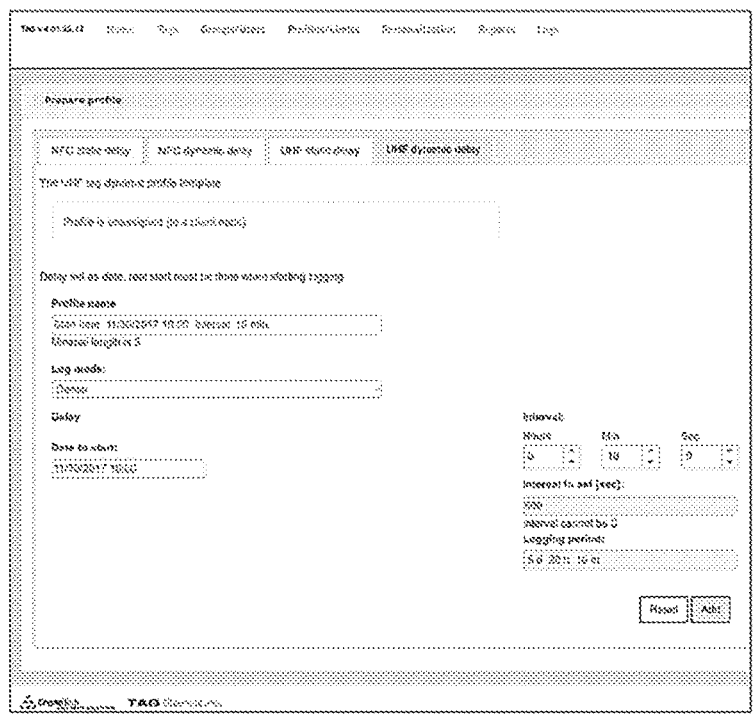
Figure 8B:
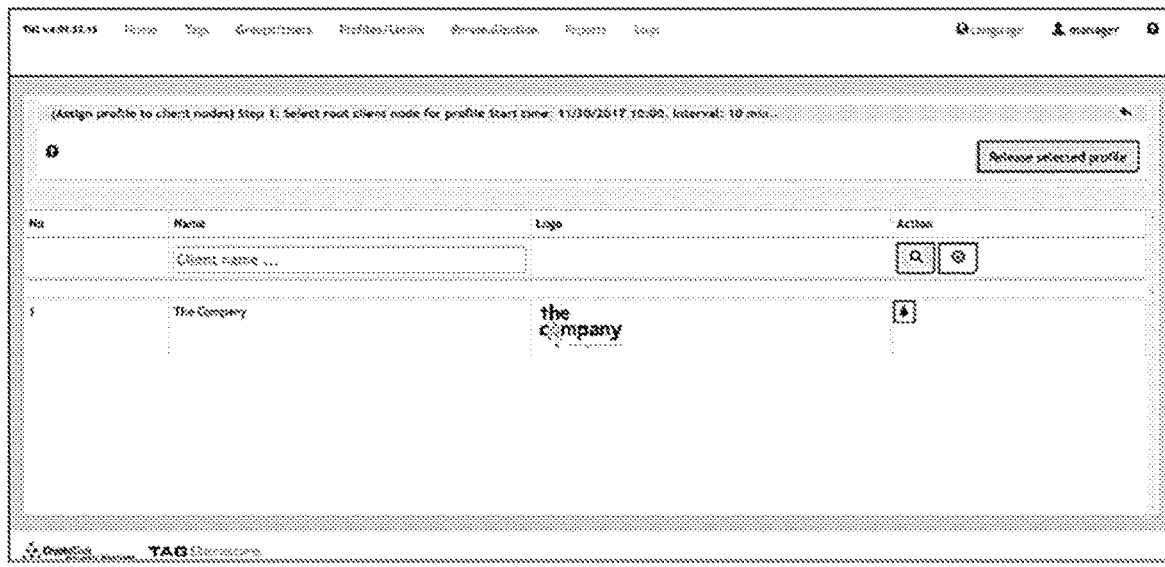
Figure 8C:
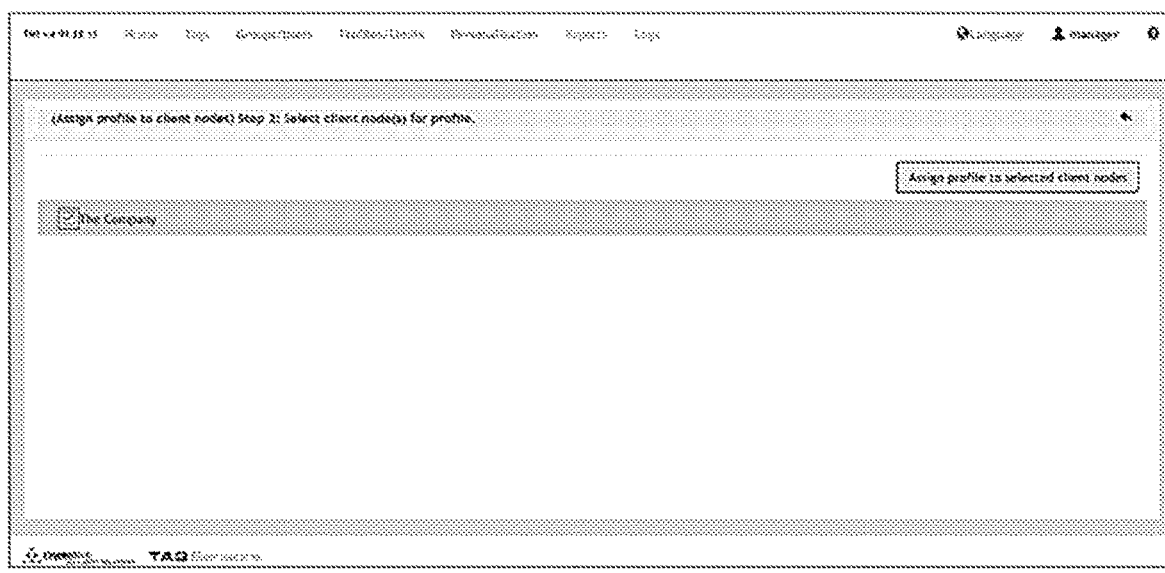
Figure 9A:
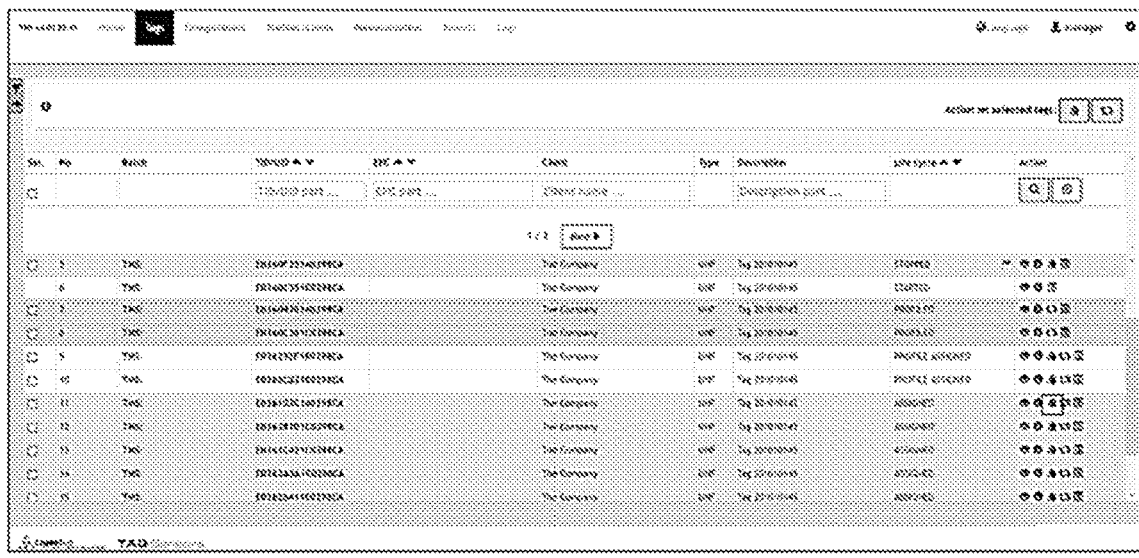
Figure 9B:
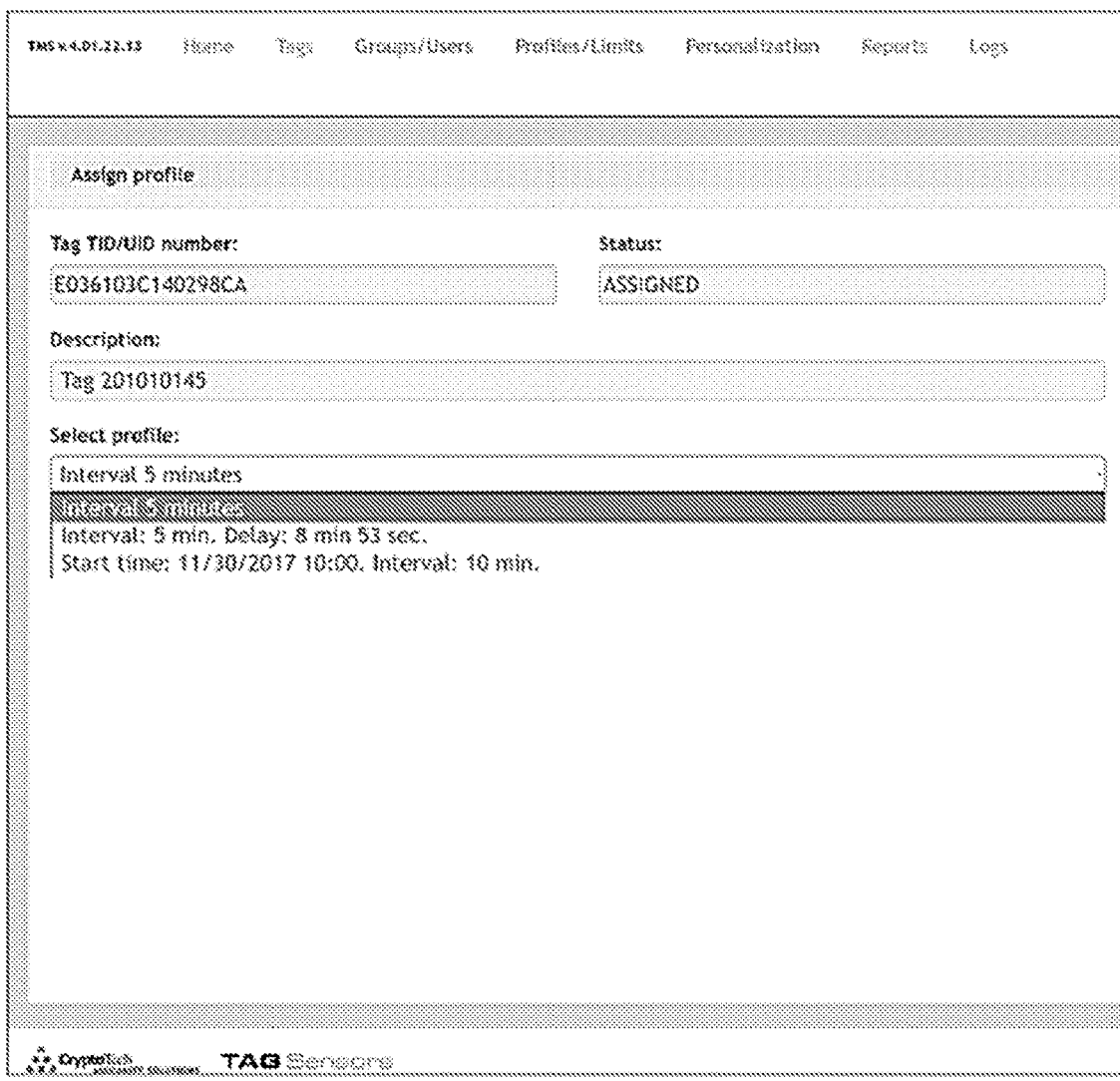
Figure 12A:
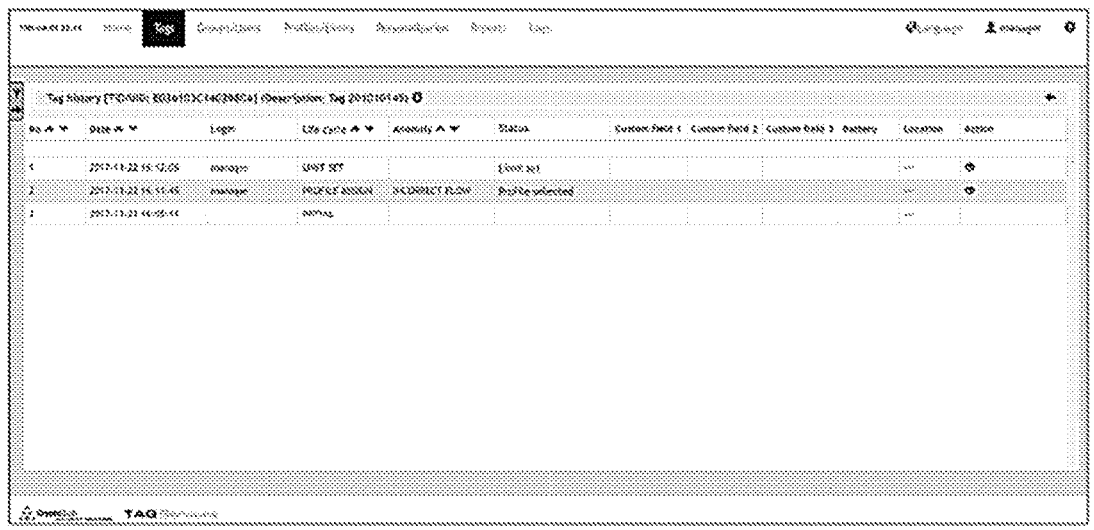
Figure 12B:
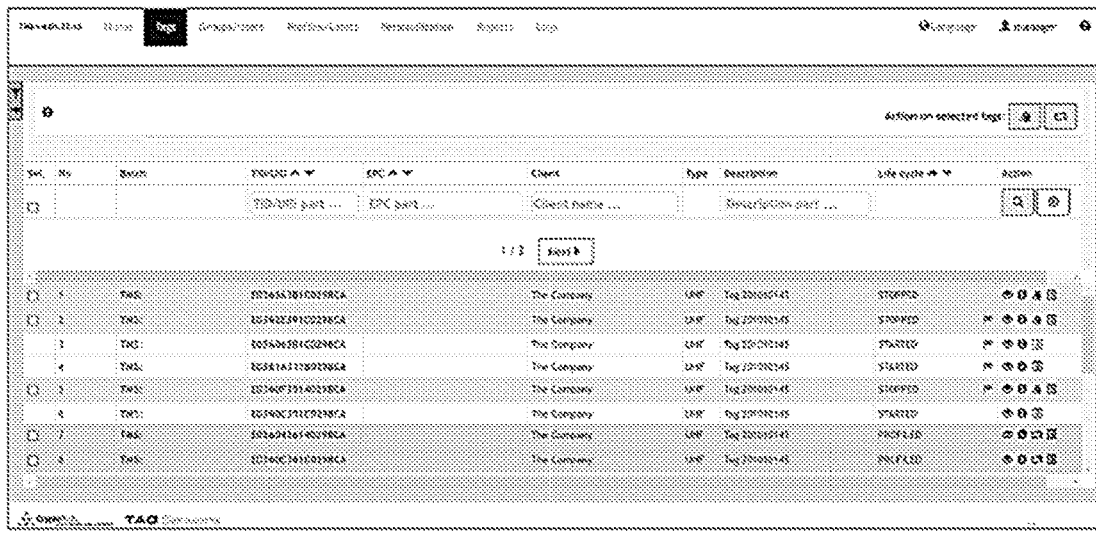
Figure 12C:
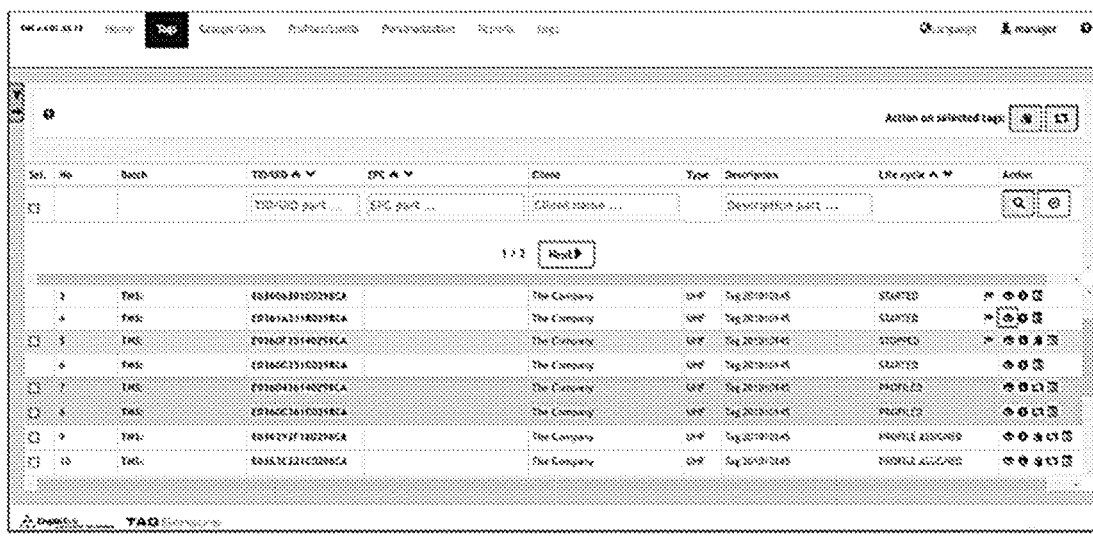
Figure 13B:
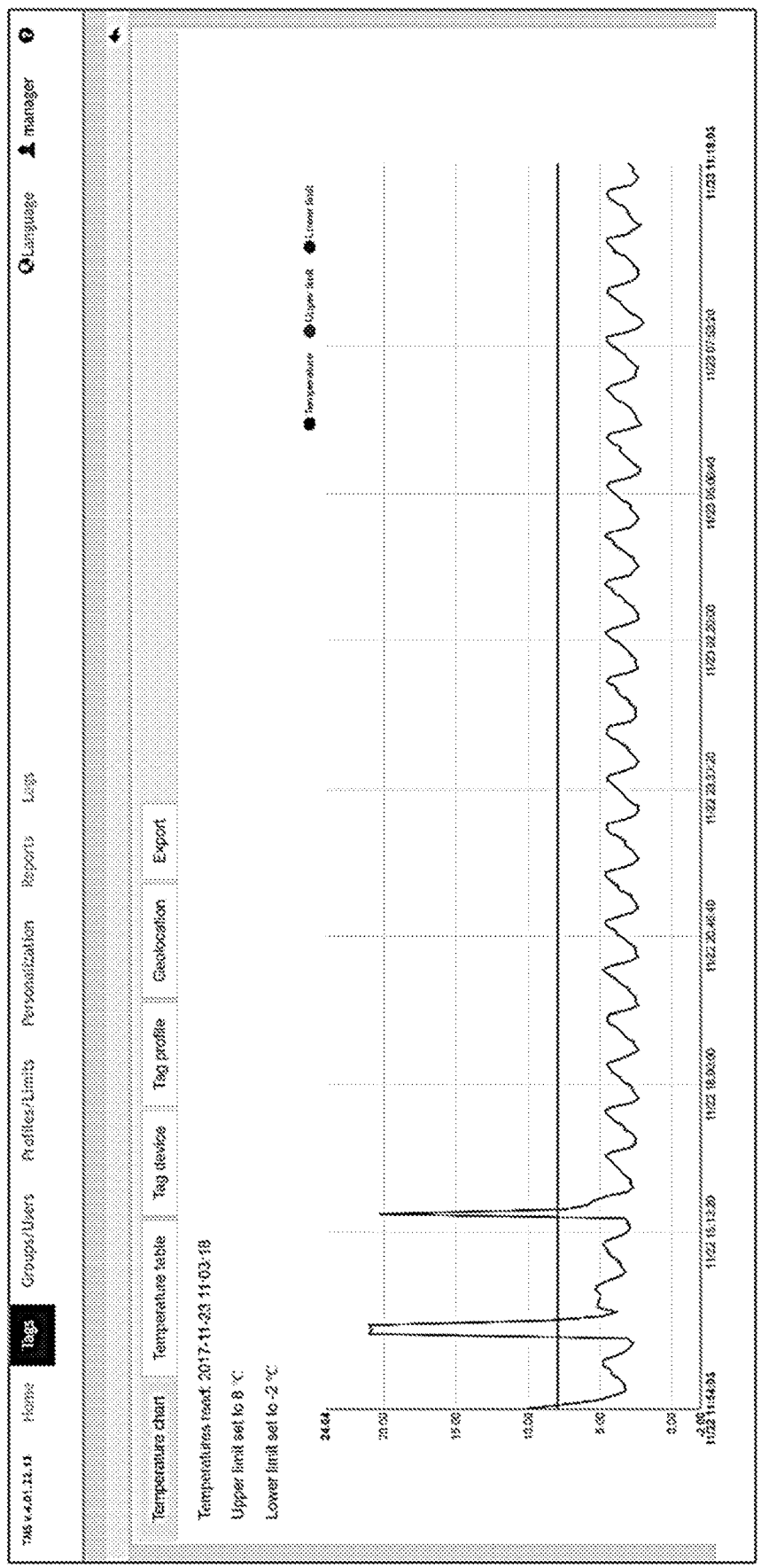
Figure 13C:
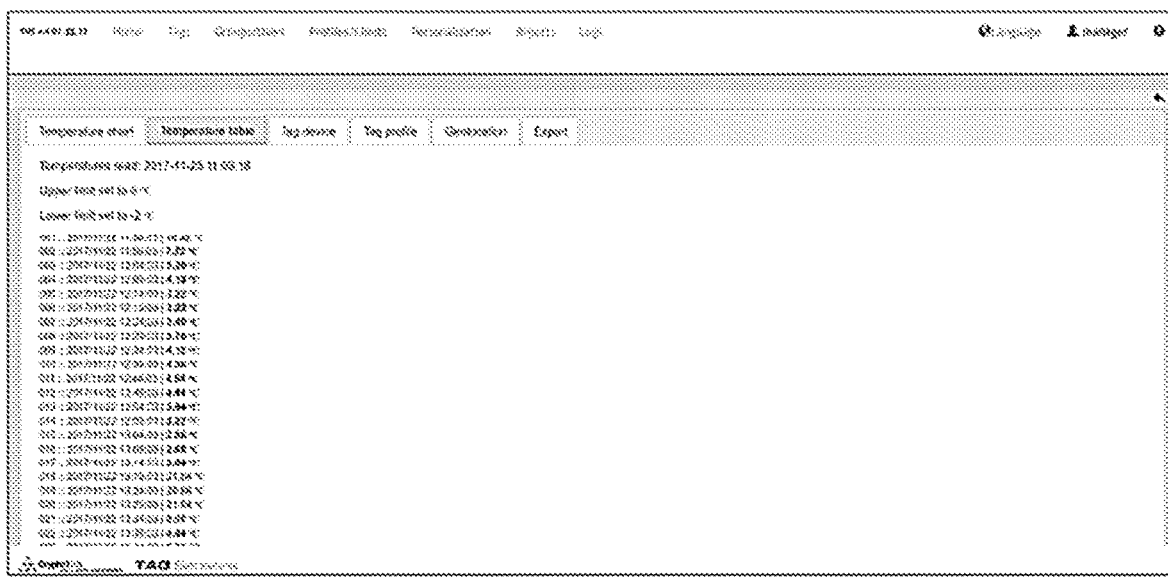
Figure 14B:
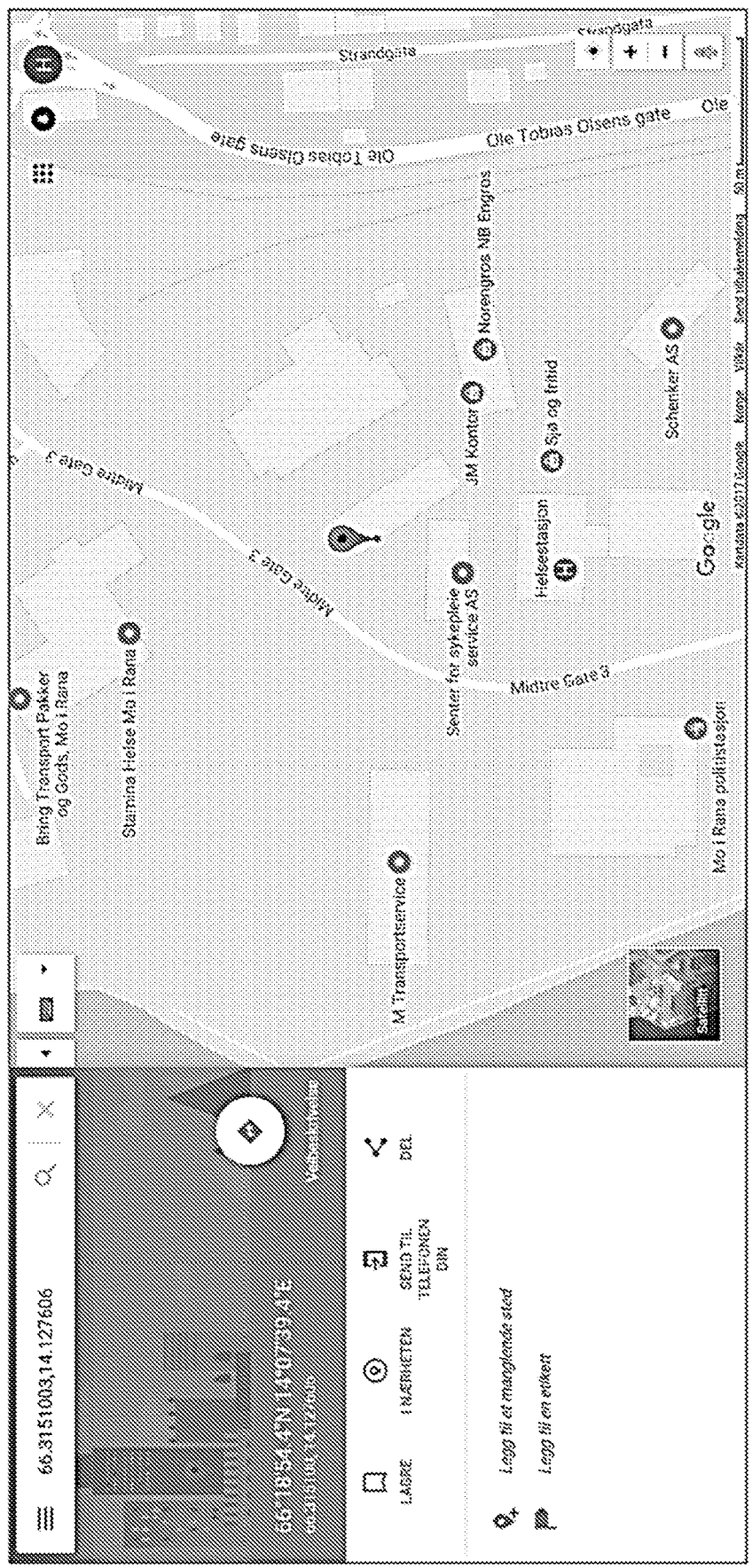
Figure 14C:
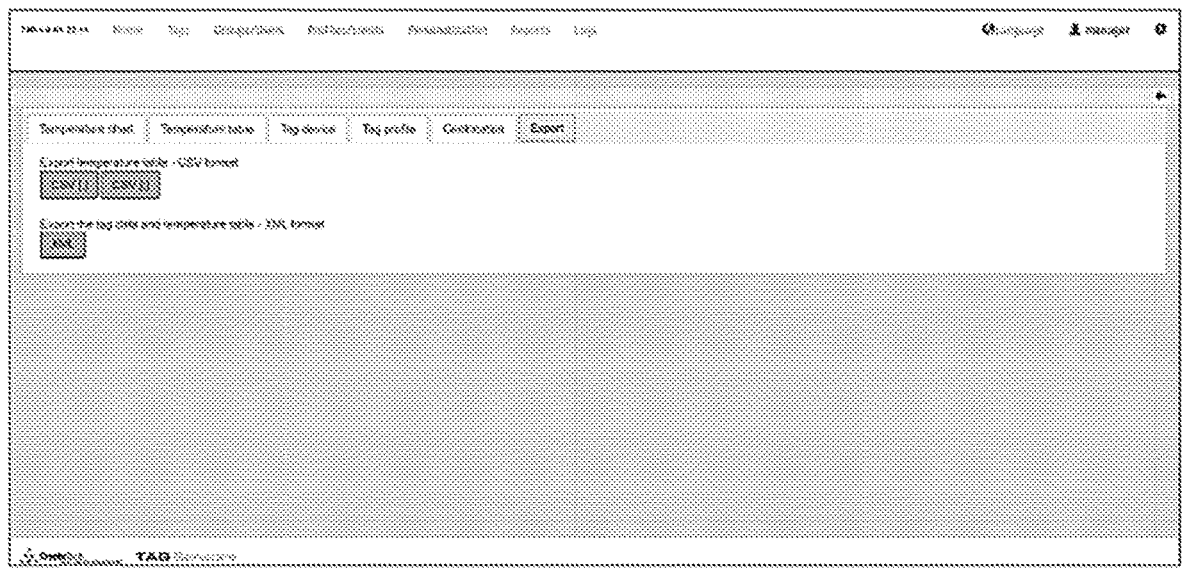
Figure 15A:
Figure 15B:
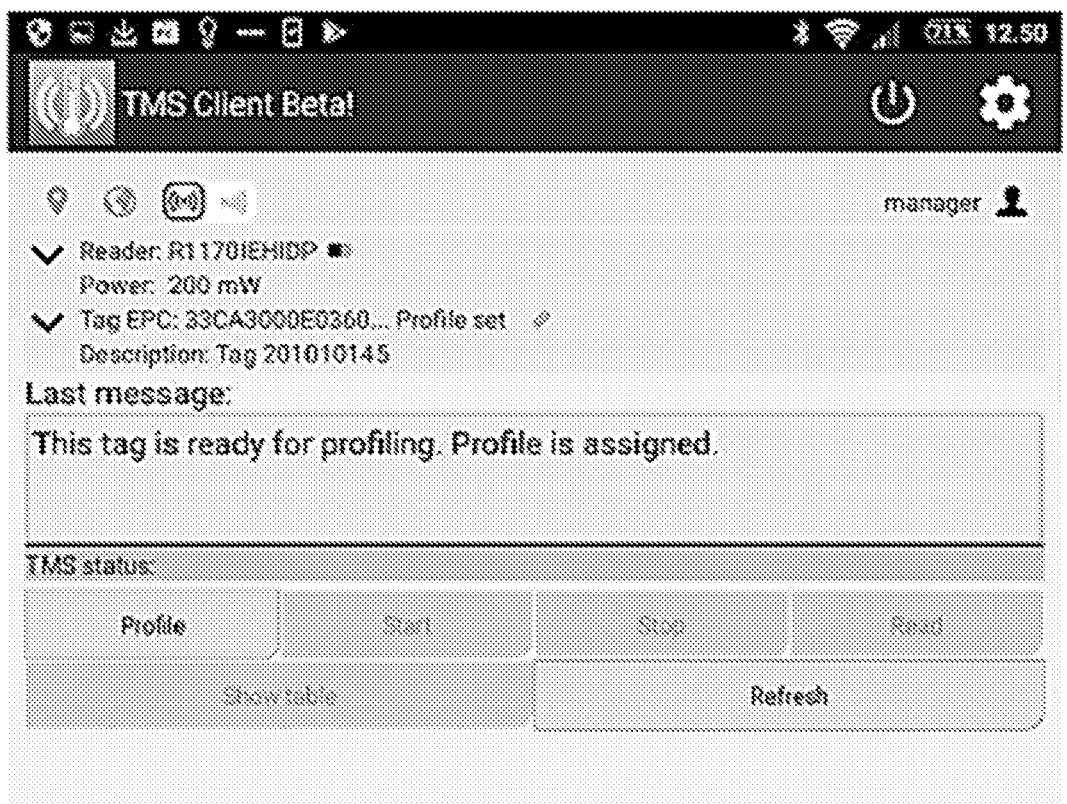
Figure 15C:
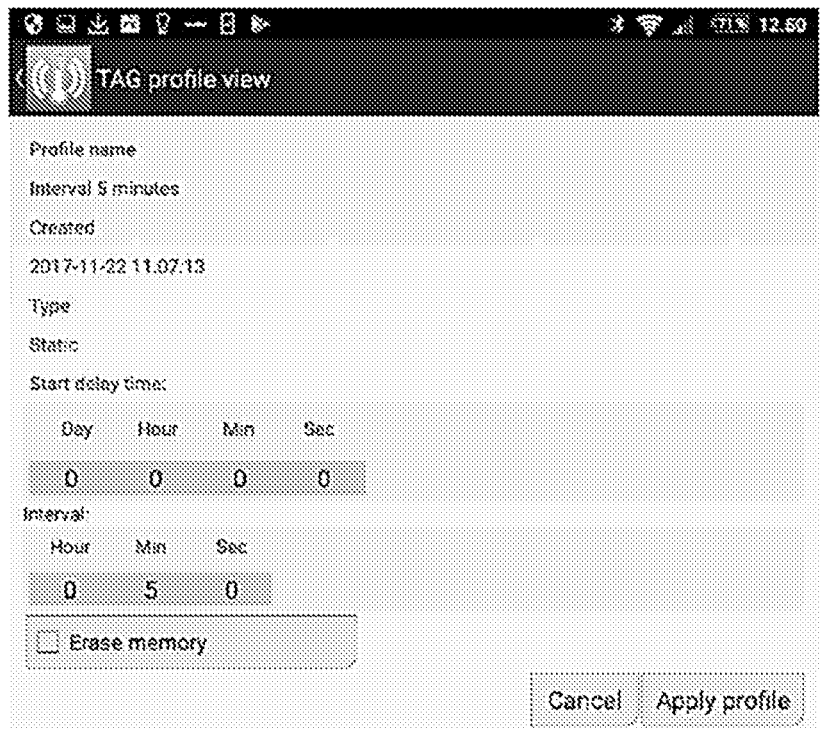
Figure 15D:
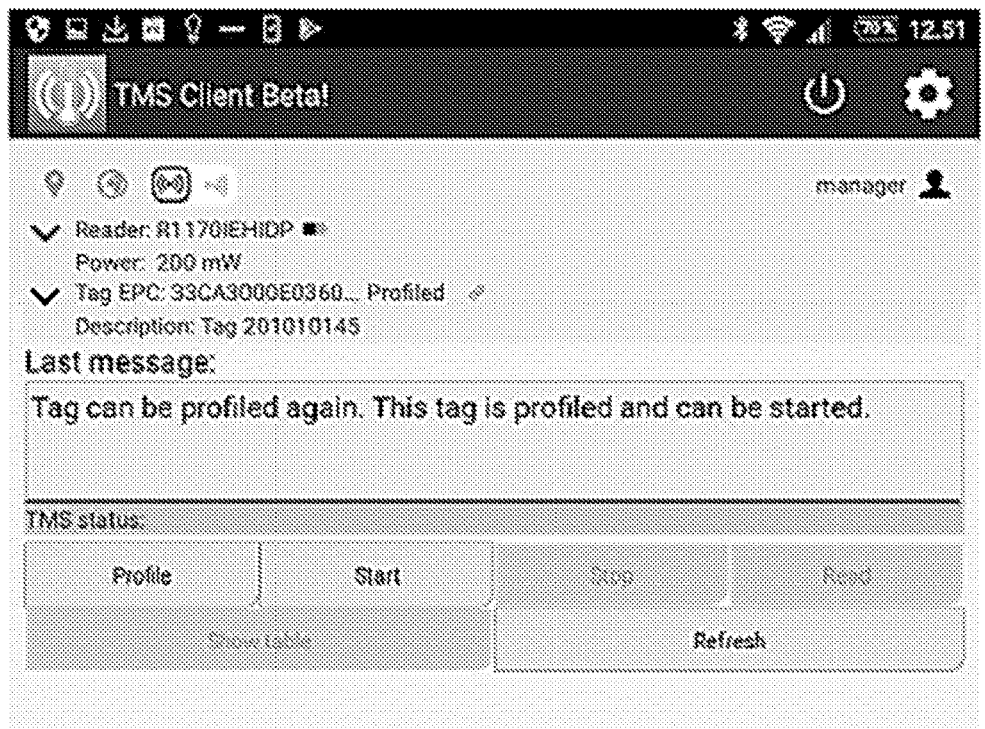
Figure 15E:
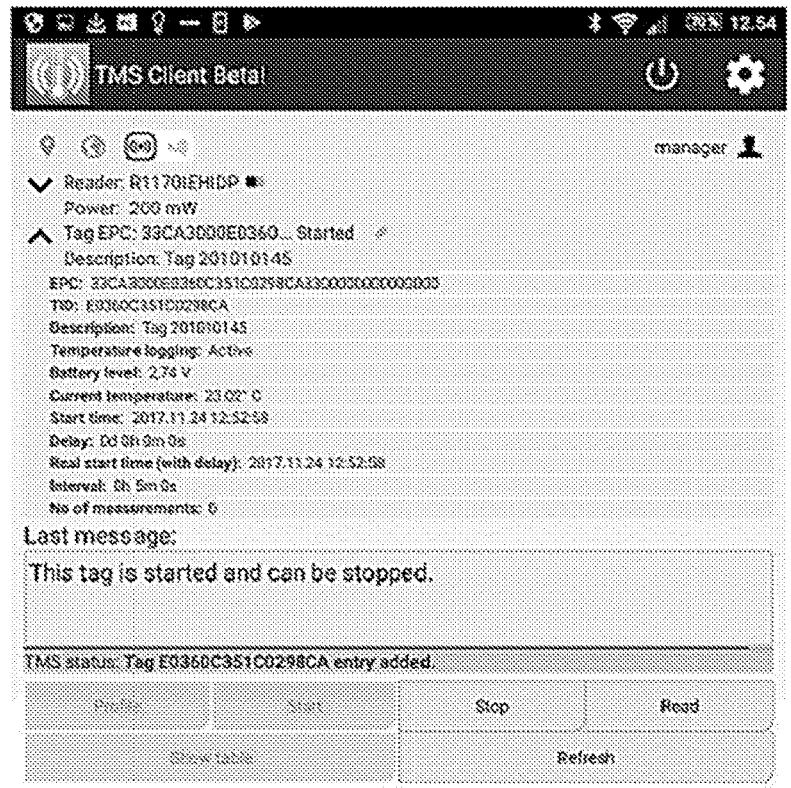
Figure 15F:
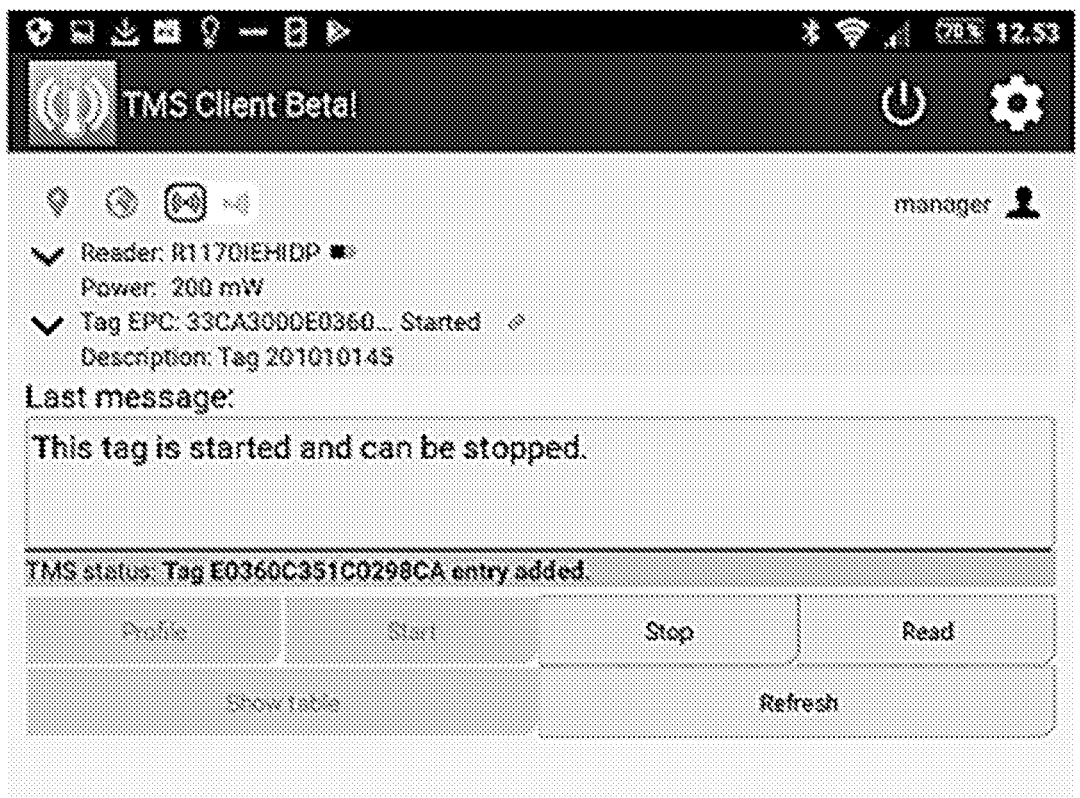
Figure 16A:
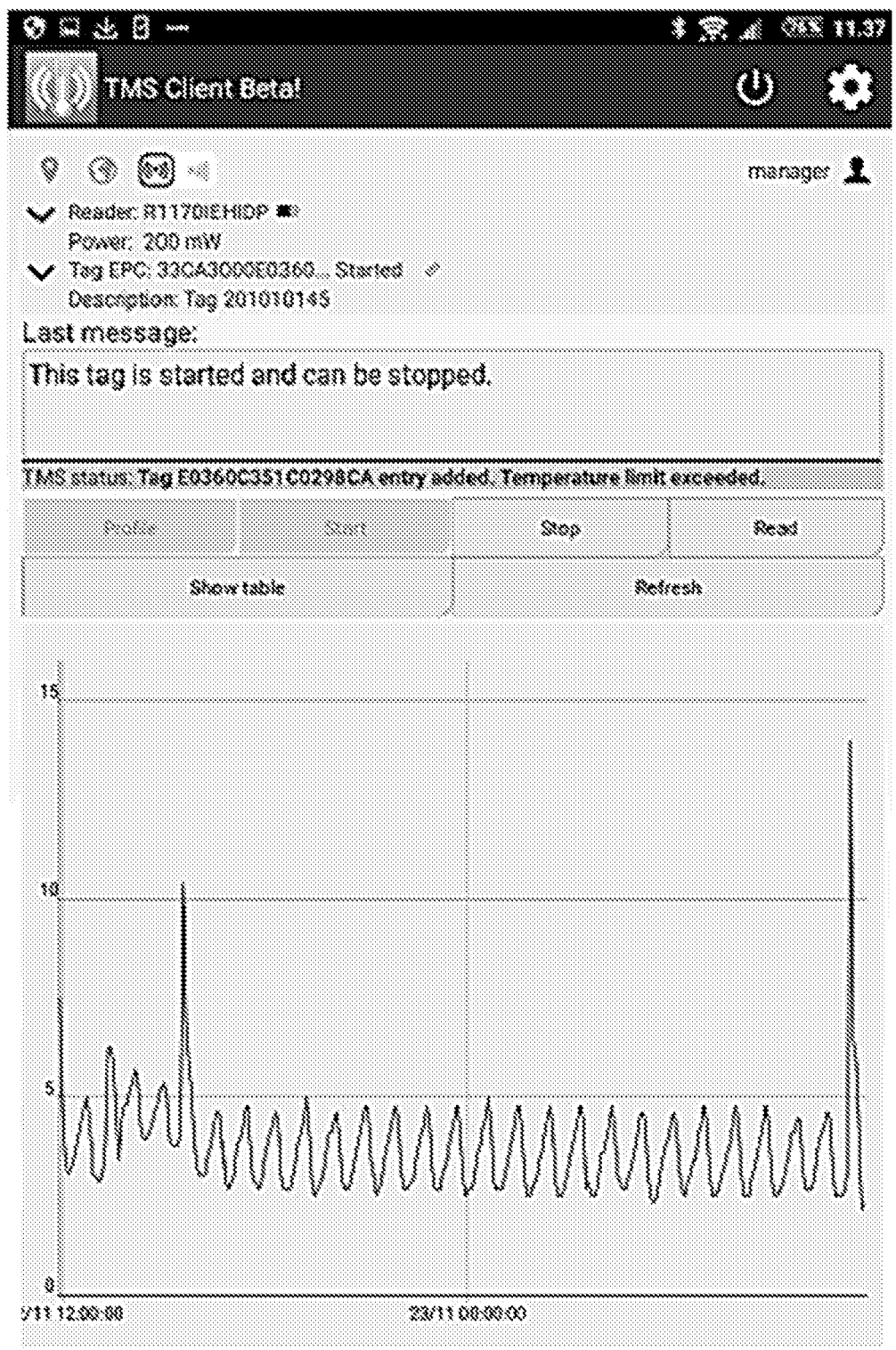
Figure 16B:
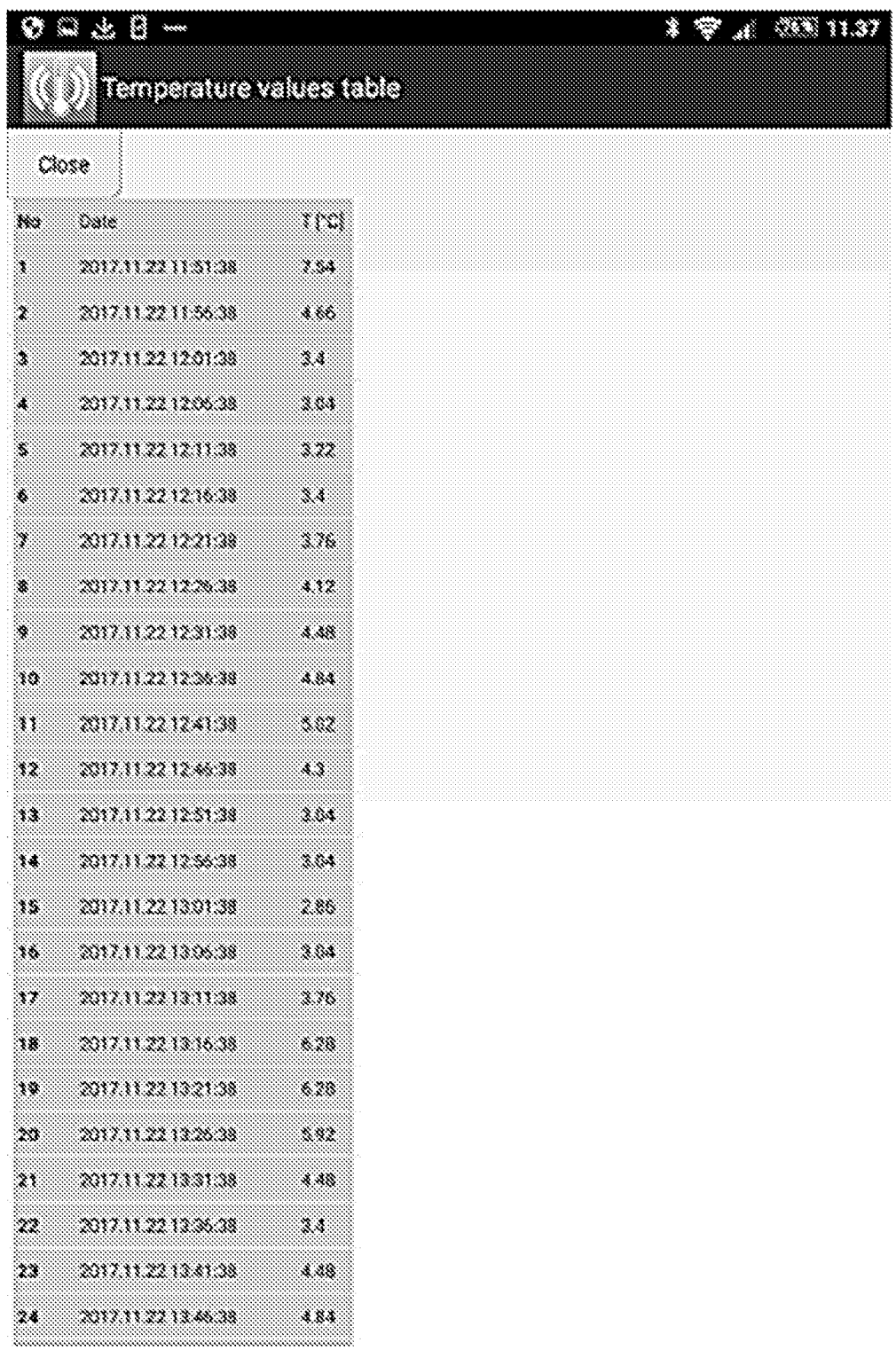
Figure 16C:
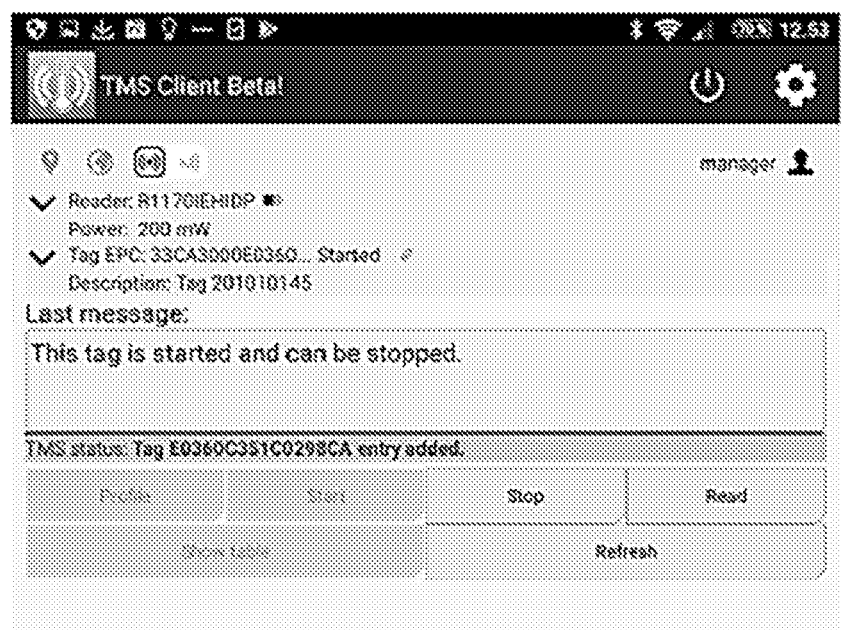
Figure 17A:
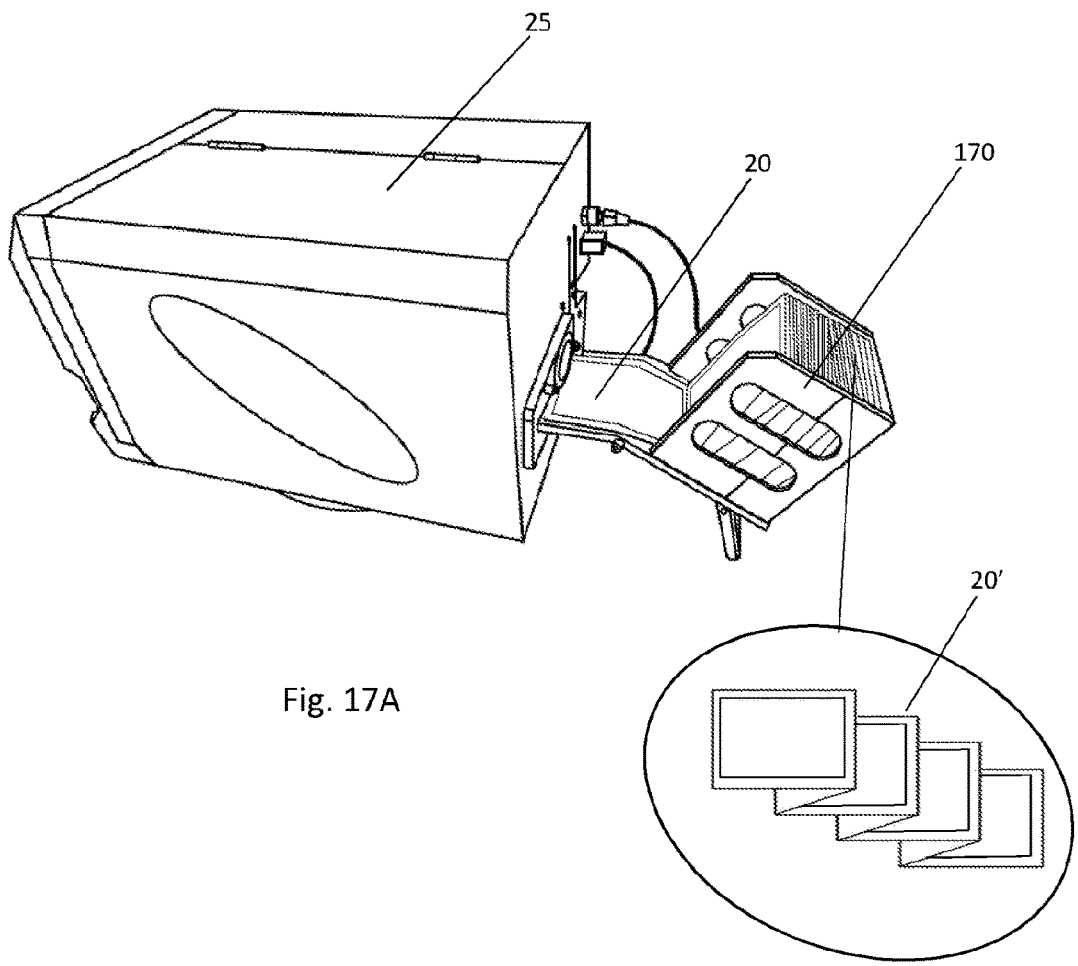
Figure 17B:
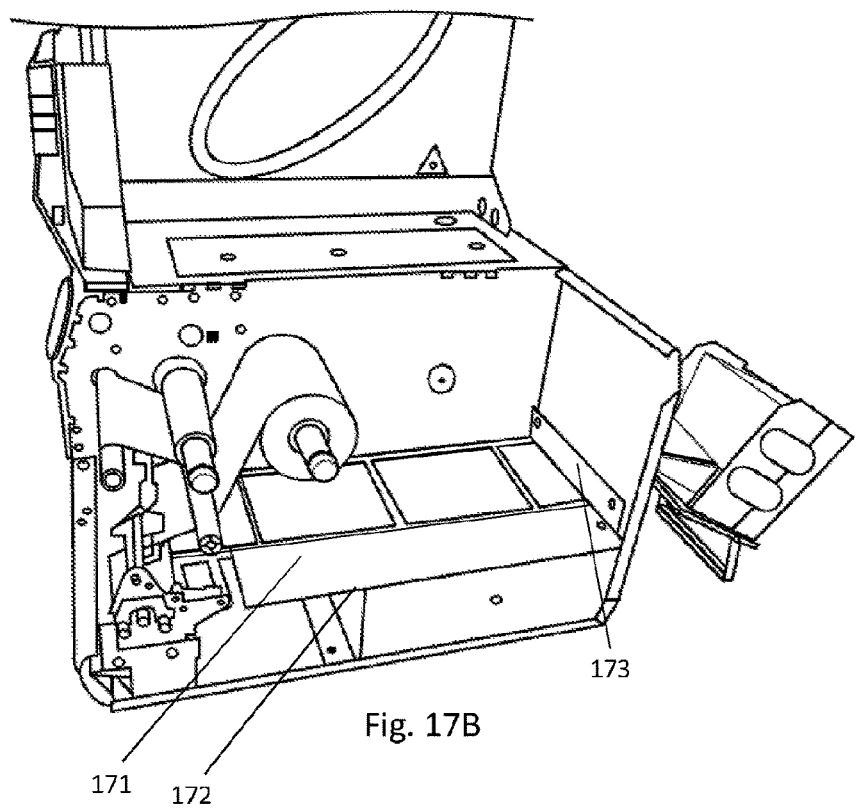
Figure 20A:
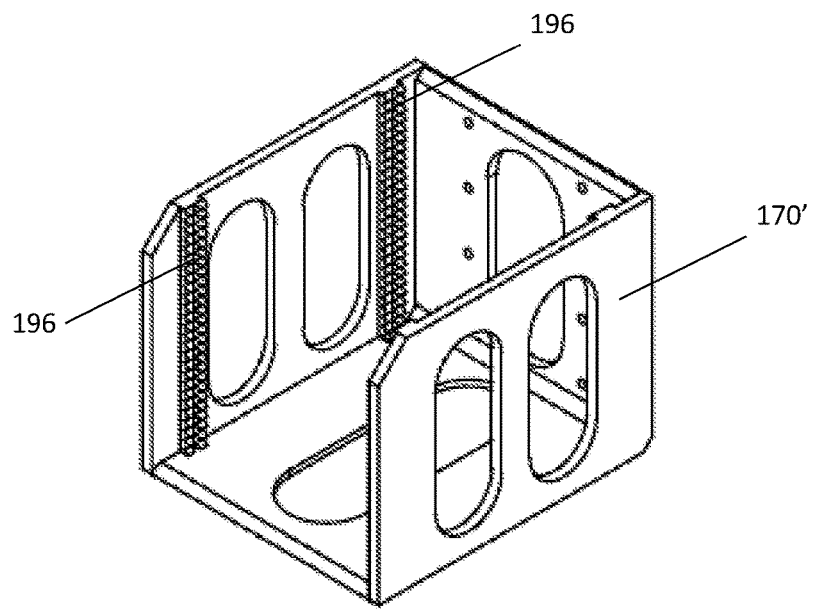
Figure 20B:
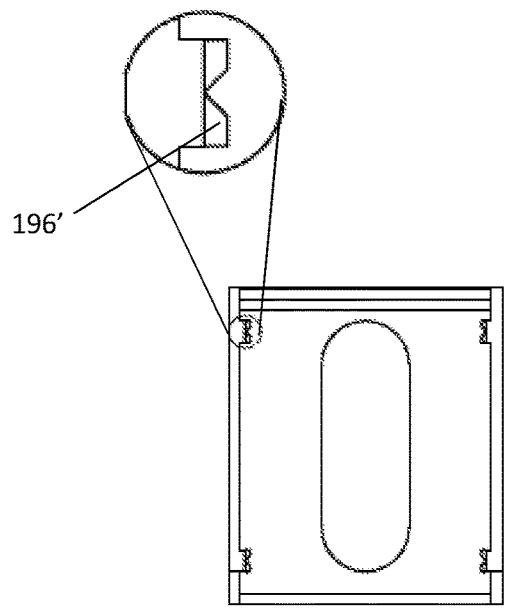
Figure 20C:
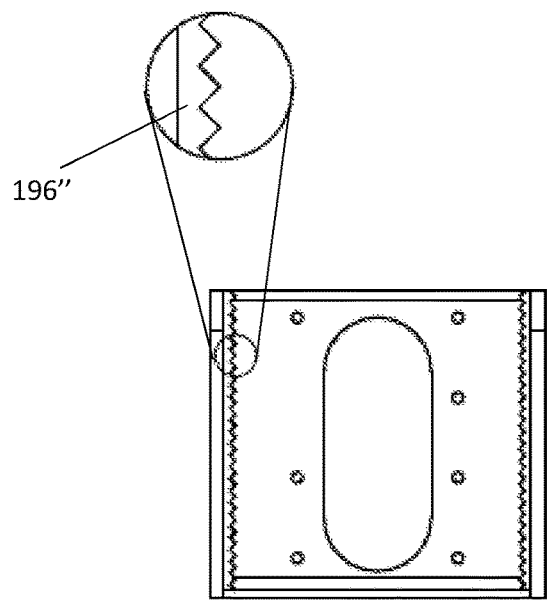
Figure 21:
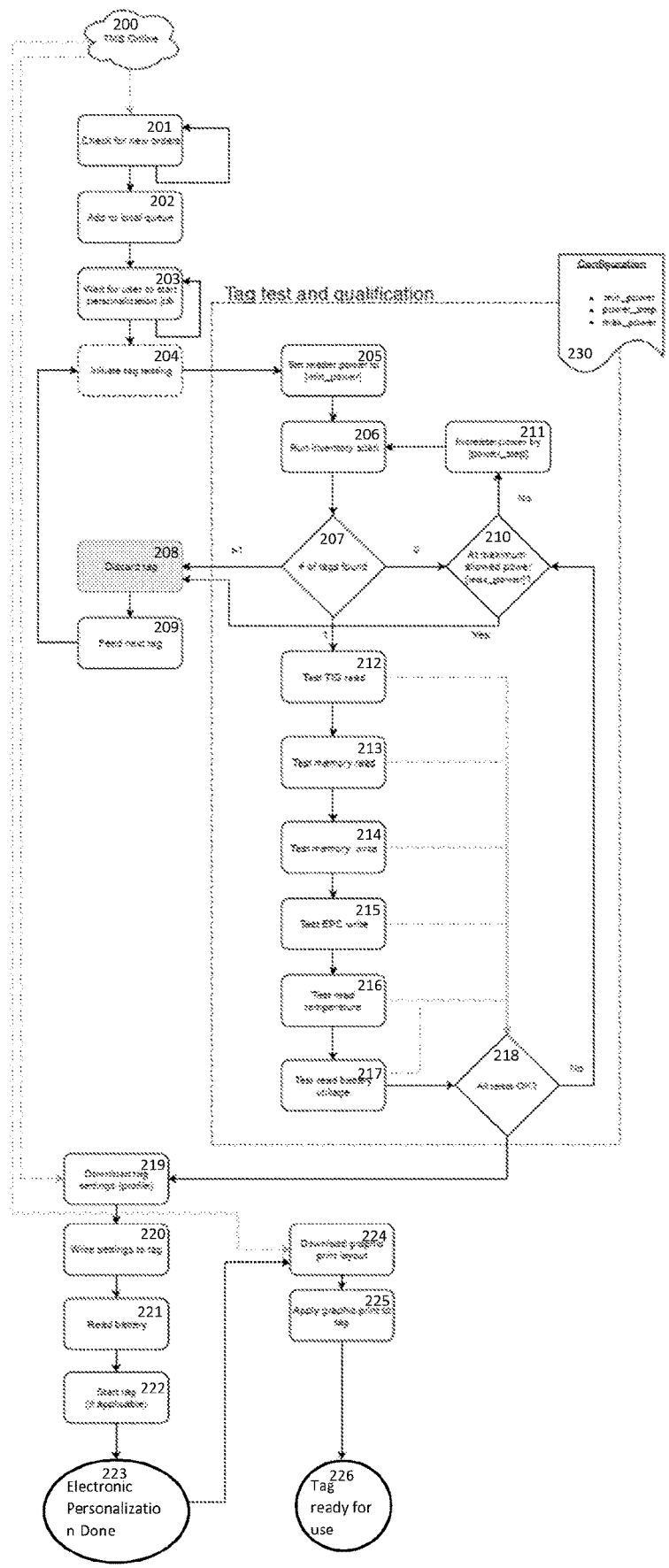

FIG. 2B illustrates an embodiment of workflow configuring and initializing use of a sensor label FIG. 2C Block diagram of sensor label example of FIG. 2A FIG. 3 shows different sensor label reader options FIG. 4 illustrates a sensor label reader communicating with sensor label and cloud services FIG. 5 illustrates a task flow throughout sensor label lifecycle FIG. 6A-C GUI example Login FIG. 7A-D GUI example assigning profile to sensor label FIG. 8A-C GUI example assign profile to client FIG. 9A-C GUI example assigning predefined profiles to sensor label FIG. 10A-E GUI example create and assign temperature range FIG. 11A-B GUI example setting predefined temperature limit on sensor labels FIG. 12A-D GUI example temperature limit monitoring FIG. 13A-C GUI example temperature log views FIG. 14A-C GUI example geolocation of sensor label activities FIG. 15A-F GUI example login and sensor label profiling and start in TMS Client APP FIG. 16A-C GUI example sensor label read and stop in TMS Client APP FIG. 17A Printer with sensor label feeder FIG. 17B Printer with open lid, label feeder board FIG. 18 Detail of RFID communication unit FIG. 19A Sensor label feeder oblique view from above FIG. 19B Sensor label feeder oblique view from below FIG. 20A Sensor label feeder box FIG. 20B Detail sensor label feeder box FIG. 20C Detail label feeder box FIG. 21 Functional diagram The following description of embodiments and entities of the invention is exemplified by discussing transport of goods in a cold chain, comprising the task of monitoring the temperature a package/unit has been exposed for, and detecting and reporting any violations of requirements such as pinpointing if, and when, temperature passed a critical value, high or low. It should however be understood that the invention can equally be adapted to a "warm chain" where it is critical to keep a goods above a specified temperature, or even between an upper and a lower temperature.

The abbreviation TMS is used in this document, and shall be understood to stand for Sensor Label Management System/Tag Management System.

When the phrase "sensor label", "tag", "sticker" is used in this document, it shall be understood as describing the temperature sensor device of the invention that is attached to the goods to be monitored, often in the embodiment of a printable label comprising an RFID chip and covered on one side by an adhesive layer.

When the phrase "RFID chip" is used it shall be understood to cover the meaning of any RFID (Radio Frequency Identification) tag, NFC (near field-communication) tag, label or card that can exchange data with a reader using radio frequency (RF) signals. It may have a built-in antenna and an integrated circuit IC. The antenna can send and receive radio waves, while the IC takes care of modulating and demodulating the radio signals, as well as processing and storing data.

When the phrase "fixed reader" is used in this document it should be understood to comprise any kind of reader able to communicate with a sensor label, and which may further be able to communicate configuration data to the sensor label, and which may even further be able to read data and other information stored in the sensor label. "Fixed" is directed to the installation in relation to the sensor label, and may be fixed on a location or carrier, such as warehouse gate, truck, train, ship, customs gate etc.

When the phrase mobile or handheld reader is used in this document it should be understood to encompass any smartphone device, TAB/PAD devices, custom readers designed for being portable and used to read sensor labels, or similar.

When the phrase geoposition is used in this document, it should mean data identifying a geographical position, either relative or absolute.

Figure 1:
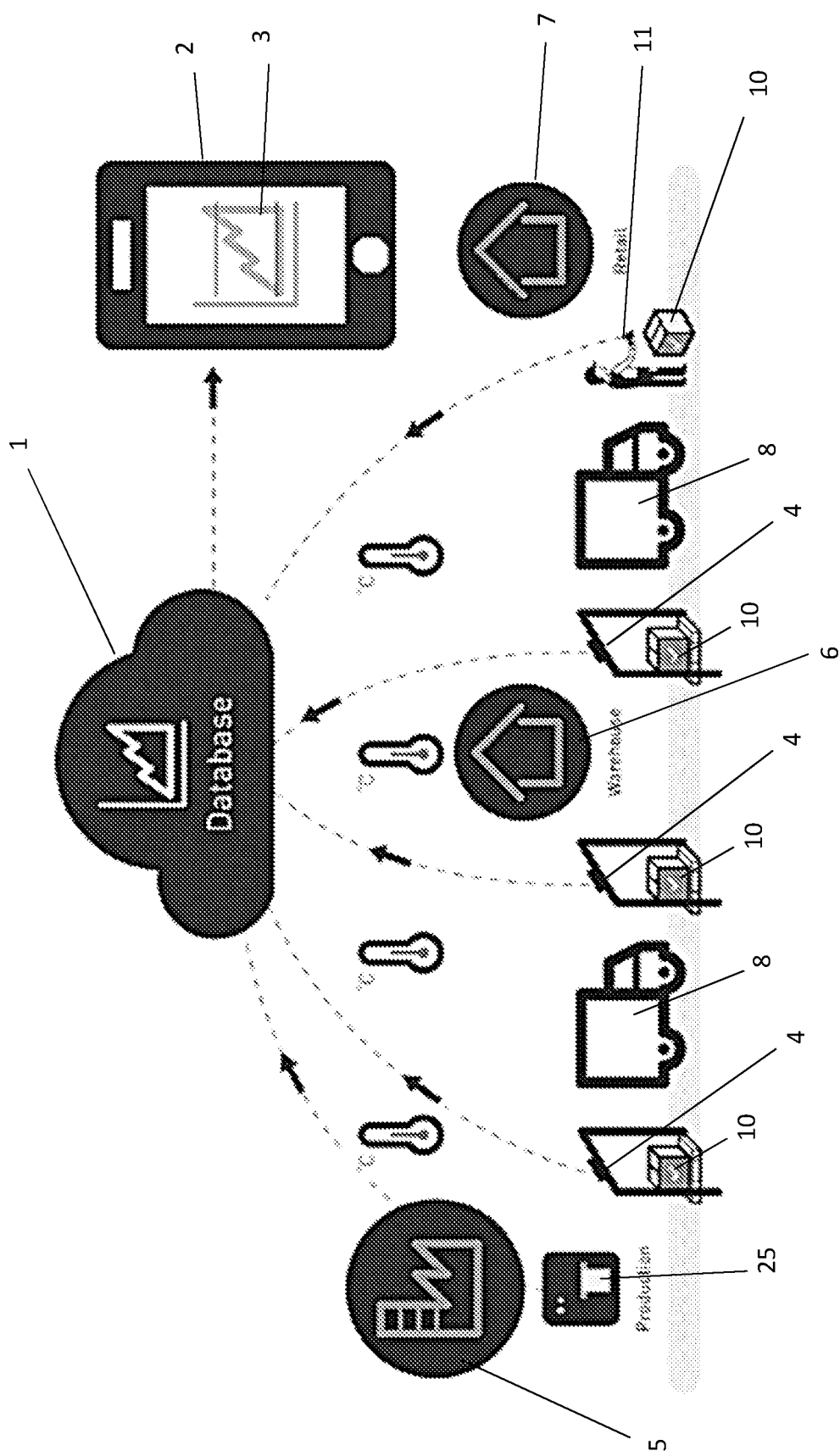
FIG. 1 shows an example of a system implementation of present invention

FIG. 1 illustrates an embodiment of a typical implementation of present invention in a cold supply chain for temperature sensitive goods 10 from food producer 5 to end-consumer 7 and comprises examples of operators and product typologies that may require a cold chain monitoring method as provided by the present invention. Operators may be one of, but not limited to production facility/producer 5, transport operator 8, warehouse/logistic operator 6, distribution transport/storage 8, or retailer 7.

The aim of the present invention is to enable a complete tracking throughout the cold chain of temperature profile of any type of goods 10. On an overall level, all the actors involved in the cold chain, i.e. producers 5, distributors 8, wholesaler 6 and retailers 7, need a higher quality of temperature control throughout the supply chain to satisfy customers' requirements at their corresponding levels. Present invention provides for lower economic losses caused by goods quality deterioration due to less temperature limit overrun, and optimize operation costs by e.g. increasing the automation degree of operations. All actors may benefit from the use of present invention.

Present invention provides high volume distributors and logistic operators with an optimized tool for providing documentation on their goods handling related to the ability to monitor and analyses temperatures in greater detail, and thus enable them to improve their cold chain operations. Thus, they may avoid the delivery of for example spoiled or harmful food, or damaged goods, and present invention may increase food supply chain transparency.

Major logistic players sub-contracting portions of their operation to third parties may be implementing present invention, using it as a tool for effectively monitoring and manage subcontractors' operations according to the quality requirements of producers, retailers, authorities or end-consumer, thus reducing damage claims in the process.

Present invention is specifically advantageous for initializing, defining an operation regime of, and printing, sensor labels for monitoring cold chain in a transport session of smaller goods packages. Examples of such smaller packages may be a pallet of salmon, or even an individual fish crate, a portable cooler transporting a medicine delivery, an order unit, such as a pallet of various dairy products, or similar.

Present invention provides for a sensor label 20 to be individually programmed and initialized at customers' facilities. The sensor label works with an online database and a printing station as illustrated in FIGS. 2A and 2B. The customer use own computer resources 24 programs, or cloud services 1 to configure the required sensor label profile and operation regime in the database. Once a sensor label profile is defined, it is transferred to the customer's local sensor label printing station 25 which programs and prints its tailored sensor label 20. The printer 25 assigns a unique ID to the specific customer sensor label 20. The customer can create one or more customized sensor label operation regimes/profiles in the online database as visualized in one example in FIG. 8, defining when sensor label will start logging temperatures, the interval between each logging and the temperature limits. The sensor label may be provided for flexible logging intervals for planned transport session from for example 1 second to 9 hours, or longer, and can record a multiple, hundreds or even thousands of data points to the memory. Once the sensor label 20 is initialized for use, the database is updated with status and geoposition if required and supported.

In one embodiment, the sensor labels 20 comprise an UHF RFID (Ultra High Frequency Radio Frequency Identification) chip 22, and contain a microchip 22 with one or more temperature sensors, memory, clock, battery 23, and antenna 21. The RFID chip itself comprises the Microchip with temperature sensors wherein the temperature sensors operating temperature range may be −25° C. to 50° C., with an accuracy of ±0.50° C. within a calibrated temperature range. The temperature sensor may have calibration certification from approved authorities. The memory comprises storage capacity that is customized according to customer requirements. The battery may provide required power for logging of more than a minimum required hours/day, for example at least 180 days, and may be provided with no toxic substances battery and component. The sensor label has a built-in real time clock which enables temperature logging in intervals, according to a user defined operation regime, between for example 5 seconds and 9 hours, or longer.

A further feature of the sensor label 20 may comprise a FIFO (First In First Out) memory configuration, such that when all memory storage allocated for data related to temperature readings has been used, the logging of temperature readings continues by overwriting the oldest temperature readings. A further counter may be provided in the sensor label 20 that keep track of how many times the sensor label memory space for temperature data has been overwritten (cycles). This way a sensor label may provide a longer tracking period, and the task of recording all temperature readings will be limited by how often the sensor label is read and the temperature data is communicated to the online database. The memory storage management of the sensor label 20 may further comprise pointers to first and last valid temperature reading residing in the memory. By analyzing counter value, and the first and last pointer value, of a temperature data transfer, the online database can decide which time intervals is covered by the recordings an which are not.

As for the antenna, it may support both Near Field Communication (NFC) and Ultra High Frequency (UHF) RFID protocols. NFC may have read/write distance up to 5 cm or there about. UHF RFID has read/write distance from 0.5 to 10 meters or longer depending on antenna design and power supply capacity. The sensor label may be produced in a manner providing for dust and water proofing, and its physical dimensions are customizable, for example 90 mm width, 150 mm height and as thin as less than 3 mm, down to 1.3 mm, 0.8 mm, 0.3 mm or even thinner thickness. The label has a first printable surface and a second adhesive back surface with release paper.

In one example embodiment, the sensor label 20, as illustrated in FIG. 2A, comprises a printed battery 23, a chip 22 with temperature sensor, a real-time clock and memory, an aluminum RFID antenna 21 and a rear-side adhesive 26 for attachment to cold chain goods 10. Typically, but not necessarily, the chip may be mounted to a thin PCB (Printed Circuit Board) together with other electronic components such as capacitors, resistors, and others. A block diagram of one embodiment of the illustrated sensor label 20 in FIG. 2A is exemplified in FIG. 2C.

There is a challenge to efficiently automate the printing and programming phase of the sensor label 20. To optimize this operation the present invention has been provided with a unique label feeder 170, customized label printer 25 and an intelligent label communication module that has accomplished to combine secure, efficient and flexible sensor label printing and initializing as illustrated in one embodiment in FIGS. 17-20. Thus, the sensor labels 20 may be produced and supplied in a basic non-initialized version, and the sensor labels 20 are customized, printed and initialized only at the time of use.

Even if the sensor label 20 of present invention is advantageously thinner than any existing temperature logging labels, components may still be harmed if rolled in a traditional label printer fashion. Instead of supplying the sensor labels 20 individually, it may be produced and supplied on an accordion style strip 20'. The challenge that remains is how to reliable feed the printer 25 with sensor labels 20.

In the present invention, the sensor labels 20 may be provided in an un-initialized state, and the sensor label printer 25 comprising standard printer components is additionally comprising a programming unit/reader 180 for communicating and initialize a transport session and operation regime with the sensor label 20 at the time of use by feeding the sensor label 20 into the printer and execute a print and configuration operation. It is a challenge to ensure that only the intended sensor label is initialized, as they are fed into the printer on a strip in a back-to-back fashion.

Several inventive steps had to be made to arrive at the present inventive concept. It was found that serial feeding sensor labels 20 towards the programming unit/reader 180 proved to be error prone. It was hard to secure that only the sensor label 20 directly adjacent the communication and programming unit 180 was the one responding to the communication between the programming unit/reader 180 and the RFID chip 22 in the sensor label 20.

Since the RFID chip 22 is unknown until it is programmed and initialized in the print operation, only an initialized RFID chip 22 in a sensor label 20 is registered in the database. It is necessary to ensure that the RFID chip 22 being initialized is the same as the one inside the sensor label 20 that has been printed. It is a challenge to minimize number of void sensor labels being printed, but not initialized and/or registered. In one embodiment, a multiple, two or more, of sensor labels are arranged on an accordion style strip 20'with almost no distance between each sensor label 20. Here, the programming unit/reader 180 must be capable of choosing to communicate only with the closest sensor label.

One error that may occur is that a sensor label 20 is printed but not initialized and optionally activated. If the sensor label 20 being printed is associated with a serial number of the sensor label 20 next in line, or a later one, the printed sensor label is void, and the data related to the actual printed sensor label 20 communicated to the server program related to the initialization is void and must be deleted. The more invalid sensor labels that has to be thrown away, the more work and wasted resources are spent on reprinting and corrective actions.

To minimize the number of invalid sensor labels being processed in the initialization and printing phase the following was found to improve the performance significantly:

First, a stretch of metal feeder board 171 was introduced arranged inside the printer stretching from above and behind the programming unit/reader 180 and towards the back wall of the printer in a manner such that the strip of sensor labels 20' inside the printer is lead towards and over the programming unit. Only the sensor label 20 in a position directly above the programming unit/reader 180 is not supported by the metal feeder board 171. Thus, the signal from the programming unit/reader 180 is not encountering any obstacles between the programming unit/reader 180 and the sensor label 40. The metal feeder board is further positioned directly in the path between the programming unit/reader 180 and any RFID chips 22 on the other sensor labels lying on the metal feeder board 171 inside the printer. It was found that leading the sensor labels 20 lying flat towards the metal feeder board 171 during programming of the sensor label being directly above the communication and programming unit 180 further reduced number of errors related to establishing communication to wrong RFID chip 22. In effect, it was found that a little raised level of a sensor label on the metal feeder board increased the number errors.

To provide further isolation between the programming unit/reader 180 and sensor labels 20 not ready for initializing and programming one or more vertical metal support walls 172 is provided, perpendicular to the sensor label feed direction, underneath the metal feeder board 172, also serving as support for the metal feeder board 171. Further perpendicular to the sensor label feed direction vertical metal walls (not shown) may be arranged above the metal feeder board 171, provided they have a slot underneath for allowing the strip of sensor labels 20 to be fed along the metal feeder board 171, for further distortion/weakening of signals from the programming unit/reader 180.

A sensor label feeder 170 is provided for holding the accordion style strip 20' of sensor labels 20 before being fed into the printer 25. A slot 173 in the printer back wall aligned with the level of the metal feeder board 171 is provided to allow unfolded single height sensor labels 20 on the sensor label strip 20' to be fed into the printer. Since the accordion style strip 20' of sensor labels tends to be likely to cling to the adjacent fold, due to cutting edge and overflowed glue and other, it is a challenge to ensure that only a single layer of sensor label strip 20' is fed through the slot 173 into the printer 25.

The sensor label feeder 170 may be constructed as an easy attachable assembly as illustrated in FIGS. 19A and 19B, comprising a feeder box 170' having at least a floor, to sides and a back wall, a feed ledge 193, and a connector plate 191. The connector plate 191 is provided with a connector plate slot 192 through which the sensor label strip 20' is fed. When sensor label feeder 170 is attached to the printer the connector plate slot 192 is arranged aligned with the printer back wall slot 173. The connector plate 191 are provided with fastening means, for easy attachment and detachment to the outside of the printer back wall. In FIG. 19B, it is shown three permanent magnets 194 provided for easy attachment to the printer back wall. Any number of magnets may be used. Other attachment means may be provided. Alignment means (not shown) may further be provided to ensure correct alignment of the connector plate slot 192 relative the printer back wall slot 173.

A further embodiment of the sensor label feeder 170 may be constructed as a prefilled closed feeder box (not shown), wherein the user only replace the prefilled closed feeder box when previous prefilled closed feeder box is empty.

A table support 195 is further provided attached to the feeder box 170' floor for providing an adjustable height elevation of the sensor label feeder 170 when attached to the printer back wall. The table support 195 may be pivotally attached to the feeder box 170'. The pivot connecting points of the table support 195 may provide a number of predefined positions of the table support 195 for easy adjustment of the height of the sensor label feeder 170.

The feeder box 170 may further comprise one or more, preferably two, pairs of friction strips 196, horizontally arranged opposite each other, or in any direction, on the inside of the side walls, for holding back the folded reservoir of accordion style strip 20' when loaded in the feeder box 170'. One such embodiment is illustrated in FIGS. 20A, 20B and 20C, where 20B shows the feeder box 170' of FIG. 20A seen from above, and FIG. 20C shows the feeder box 170' of FIG. 20A from above looking into the feeder box 170' towards the back wall.

The friction strips 196 serves two important functions. First, the friction strips 196 ensures a certain hold back force of the accordion style strip 20' of sensor labels 20. This hold back force is important for keeping the strip of sensor labels tensioned when led over the metal feeder board 171 inside the printer 25. Thus, with proper tension in the strip, the sensor labels 20 are always kept flat down towards the metal feeder board 171, and fewer errors in initializing and programming the sensor labels 20 occur.

The second function of the friction strips 196 is that when partially holding the accordion style strip 20' in the feeder box 170', the friction strips 196 ensures that only one fold at the time of the accordion style strip 20' is released from the feeder box 170'. Thereby, it is possible to avoid a double strip to be fed through the connector plate slot 192 and the printer back wall slot 173. Such double strip feed will increase the risk of clogging the feed line, damaging the RFID chips 22 and faults in the initializing and programming phase of the sensor labels 20.

The friction strips 196 are found to perform best having a design as described in FIGS. 20A-C. A double 196' pyramid/saw tooth 196" form as illustrated in detail in the blown up sections of FIGS. 20B and 20C may be chosen. The illustrated friction strips may be formed as an integrated part of the feeder box 170', for example in the same material. Other friction strip 196 design and material may be chosen, such as for example, but not limited to, Velcro hook/loop strap, row of pin heads, roughened inside side walls of the feeder box 170'.

The programming unit/reader 180 communicate wirelessly with the RFID chip on the sensor label 20, and in order to further improve success in communicating to the correct sensor label when printing, initializing and programming a sensor label 20, a production sequence as described in the function diagram in FIG. 21 is facilitated.

Being connected online or offline to a TMS system 1, 200 the printer 25 and/or connected local computer resource receives 201 and initiate a sensor label 20 initialization and printing session 202. The printing process may be controlled by an application running on a local computer to which the printer is connected; alternatively, the printer is remotely controlled by a remote computer or the TMS 1, 200. The local computer may also be integrated in the printer device. The printer controlling computer arrange for personalization 203 of the initialization and printing of the sensor label 20. A dedicated routine is provided for testing and qualification/ authentication of the closest sensor label (the one directly above the programming unit 180), and when the routine is started 204 the routine receives configuration data 230, the configuration data 230 may be dynamically changed during the qualification process. The configuration data 230 may be manually changed by an operator, or the system may automatically change the configuration data before, after or dynamically during operation based on success rate in the test and qualification process of the sensor label 20.

The reader power is set to a minimum power setting 205 when first trying to send an initiating request in form of an inventory scan 206 in this specific embodiment. Inventory scan 206 may typically send out a request for an EPCID (ElectronicProductCodeID) which often requires the least power requirement of the communicated signal for enabling the RFID chip 22 to respond. Typically, the minimum power setting 230 is defined such that an EPCID can be successfully returned at the distance between the programming unit/reader 180 and a directly above arranged sensor label 20. Other sensor labels may require different types of initiation request protocols to be supported.

The resulting number of sensor labels 20 responding 207 to the inventory scan 206 defines the next action.

If no sensor labels 20 responds, the reader power is increased 211 if a maximum power level has not been reached 210, for example by a predefined power step or a next predefined power level, before a new inventory scan is performed.

If maximum power level has already been reached 210 or if more than one sensor label 20 responds 207, the process may choose to discard 208 the current sensor label 20 and request a feed next sensor label 209 for programming, and new initiating of sensor label 204 restarts the initiation process.

If one sensor label 20 responds 207 to the inventory scan 206, the process may be provided with a number of tests to be performed towards the RFID chip 22 of the responding sensor label 20. These tests may comprise one or more of, but not limited to: testing if TID (Tag ID number) can be read 212, testing if user memory can be read 213, testing if user memory can be written 214, testing if EPC (Electronic Product Code) can be written 215, testing if temperature sensor can be read 216, testing if the battery voltage can be read 217. If any of the tests returns with an invalid result 218 the power may be increased further 211 before the inventory scan operation 206 is reattempted.

The operation of the various features of the RFID chip may require higher power levels than required to return the EPCID response. Therefore, the maximum power typically is considerable higher than the minimum power defined for an EPCID to be successfully returned. If the power level is already at maximum 211, the sensor label is discarded before a new sensor label feed 209 is performed and initiation 204 is run.

If all tests are OK 218, the programming of the sensor label is started, for example by first downloading sensor label profile 219, and writing the profile/settings to the RFID chip 22 of the sensor label 20. If battery is read and approved 221, the RFID chip 22 may start 222 the monitoring operation of a transport session comprising periodic reading of sensors, such as temperature sensor, and store each reading.

When the personalization of the sensor label is done 223, the graphical presentation defined for the sensor label is downloaded to the printer 224, and the printer prints 225 the defined graphical presentation to the printing surface of the sensor label. The sensor label 20 may then be attached 226 to the goods to be monitored/temperature logged.

In a further use embodiment the printer 25 and system for sensor label printing may well be adapted to automatically feed a robot palletizer.

As illustrated in FIG. 3 an embodiment of a system according to the present invention may provide for measurement, logging and reading temperatures, thus providing the user with the ability to check the monitored temperature readings during transport/logging period. It is thereby possible to read the temperature information locally at the location or of the goods marked with the sensor label and remotely collect and document potential deviation in the cold chain.

The system may consist of a database 33, client applications 32, readers 4, 11, 31, and sensor labels 20 (also described as tags or sticker) for temperature logging. The sensor labels 20 are first registered in the database 33 and may be started, read and stopped by the client application 32. The application 32 may also read and display a temperature log from the sensor label 20. The database 33 may give access to the temperature logs from a multiple of/all the clients' sensor labels 20. Such logs are exemplified in FIGS. 13B and 13C.

The database 33 is set up to keep track of all sensor labels 20, their owners and users, as well as information about all events in a sensor label 20 lifecycle. The database 33 may provide an overview of the temperature readings in a cold chain for any/all products for example from a specific client, department, operation or other. The temperature readings may span over a complete life cycle of a sensor label 20 both during transport and temporarily or permanent storage. Temperatures can be read, monitored and communicated by reader 4, 11, 31 to a database 33, and database features may comprise warning message to be sent to the owner/user if a preset temperature limit is crossed.

Customization of the sensor labels 20 may comprise one or more of surface printing of logo, QR code and SCC code on front surface 27, and initializing/programming the RFID chip 22 of the sensor label 20 with for example delay time until activation, frequency settings for temperature logging intervals, and other customer specific data. The sensor label may also be activated during this process, which makes it ready to use in a single operation. Thus, the sensor label may be activated by an activation routine in a printer 25, or in a fixed reader, or in a mobile reader as illustrated in FIGS. 2B and 3. The database 33 entries of the temperature readings may comprise geoposition 28 data. Any of the printer or a reader device 4, 11, may support and add a geoposition 28 entry to a specific reading session and communicate the geoposition of the action to the database 33.

The handheld/fixed installation reader device 4, 11, 31 communicates with the sensor label 20 using Bluetooth, RFID, NFC, or any appropriate communication protocol, and connects to the database service 33 via wired or wireless communication over for example WLAN or GPRS. The database service may be located on site as a computing resource 24, or as a remote server/cloud based database 1 service, or both. Thus, local readers 4, 11 may communicate with local computing resources 24, which then communicates data from a read sensor label to a remote server/cloud based database 1. In FIG. 3 it is illustrated two possible routes of communication between sensor label 20 and the cloud/database 33 are provided. In the left side of FIG. 3 it is shown a reader 4, 11 able to run an application 32 which communicates with the user via a graphical user interface, and the screen and reader 4, 11 may further be provided with means, such as buttons, keyboard, touch sensitive screen, audio input and analyzing capacity, for receiving input commands and data from user. The reader 4, 11 communicates directly with the sensor label using UHF RFID, NCF or other appropriate communication protocol. An alternative track is shown on the right side of FIG. 3 wherein the application 32 is run on a mobile/smart phone 11, and the mobile/smart phone 11 communicates with a further reader device 31 over a Bluetooth communication protocol. The reader device 31 is communicates data from the sensor label 20 to the mobile/smart phone 11.

The present invention is specifically adapted to provide mapping of data from a cold chain, for example, temperature data from long-term storage of goods, and data analysis of such data comprised in databases according to big data analysis concepts in order to visualize and enable:

Improvement of logistics of goods in cold chain operations

Increased knowledge of quality of goods and temperature profiles over longer time intervals Identification of weak links in the cold chain enabled by geoposition data and temperature logs A further advantage of the present invention is the ability of personalization and setup of the sensor label 20 in the printer, which enables:

Combined printer and RFID interface for seamless operation

No further initialization or setup of sensor label required after print of label process is completed.

The cloud processing of the analyzed data from the sensor label may comprise an alarm functionality which notifies a client when temperature reading exceeded a specified limit, and transmit signal analysis to any of for example a reader 4, 11, or cloud connected entities such as computer via e-mail alerts or online monitoring programs.

When for example a browser app 32 reveals an alarm situation as discussed above, the product can immediately be taken out of the transport chain, or the product can be marked for later actions. Additional features may be provided to prevent user error and communication failures effects in cases where goods with temperature reading exceeding a limit slip through unhandled. The cloud implemented warning procedures may then provide/initiate safety precautions for further handling of the actual.

The sensor label 20 in present invention may be provided with a customizable temperature range spanning a specific temperature range of interest. By limiting the temperature range, for example between −10 to −25° C. (Δ15° C.) it is possible to increase the measurement resolution.

The sensor label comprised in present invention may be fully recyclable, and by using environment-friendly sensor labels, the present invention enables advanced tracking of the cold chain without the need for precaution measures for special handling of the used sensor labels at the end destination.

The sensor label may be provided with a configurable temperature operation field. Thus, with a flexible printing process, an end client is enabled to specify the working span of each individual sensor label at a product shipping station. Thereby, enabling a highly granular flexibility for the customer to customize, on site, the use of sensor labels for many different applications in different temperature ranges.

In a further embodiment of the invention, the configuration of operating parameters of the sensor label, such as frequency settings for temperature logging intervals, is offered for customization based on one or more of the battery configuration/capacity, battery type, battery voltage reading, and percentage of rest power in battery. The user may be offered a menu comprising the selectable configuration options in a GUI of an application 32 running on a mobile/smart phone 11 able to communicate with a printer 25 and/or the sensor label 20. The battery configuration may be retrieved from one of: download a preprogrammed value in the TMS, returned from an initial TID 212 reading of the Sensor label, or returned from a test read of battery voltage 217, or other.

Now the lifecycle of the sensor label usage and interaction with the various entities of the system will be discussed. FIG. 5 illustrates one embodiment of a task flow throughout a sensor label lifecycle, wherein steps in the sensor label lifecycle is presented horizontally and different systems involvement vertically. Vendor is in FIG. 5 named as "TAG Sensors".

A sensor label must be registered in the database before it can benefit from the functionality in a TMS Online Services that may be provided by for example the vendor.

When the vendor has assigned the sensor label to the client (owner). Then the sensor label is visible for the client in a TMS Online Services application.

The clients may then define their own sensor label profiles as specified for example by products or group requirements. A sensor label profile may comprise start time and log interval, where log interval is time between logging each temperature measurement. The start time may be one of, but not limited to:
- immediately after activation,
- delayed for a user specified period wherein the period may be limited by hardware capabilities, for example up to 9 hours, or
- postponed to a given date and time in the future The sensor label profile may be transferred from the TMS Online Services to the sensor label via a mobile application or RFID protocol as discussed above.

When the sensor label receives a start command from the user through a TMS client application, the sensor label starts logging of temperature immediately, after predefined delay has lapsed, or at a defined future date and time.

When started, the sensor label starts temperature logging with intervals based on user defined settings in the sensor label profile. The sensor label continues to log temperatures until it receives a stop command or, if memory has no FIFO capabilities, the sensor label memory is full.

The sensor label is read by the user through a reader comprising a TMS client app which reads and transfer data from the temperature log of the sensor label to the database. In addition, geoposition data defining where the sensor label is read may be encompassed in the data transfer.

User permissions, which may be individually set for each user in the cold chain, may define whether the data is returned to the client application and presented graphically or in table format to the user. If temperature limits are defined, these may be visualized by lines in the graph or colors in the table.

After the measurement period has ended, the sensor label may be stopped by the user through the TMS client app.

If the sensor label has remaining battery capacity, it can be recycled by performing a reset process, which may constitute of the profiling process being performed anew. When recycling a sensor unit, the memory in the sensor label may be erased. This may be performed by an Erase procedure provided during the profiling process.

Now a typical Graphical User Interface and interaction procedure is shown for allocating and using a sensor label according to present invention on a package being transported. It is emphasized that this is only one of many possible ways to implement a GUI for the present invention, and shall not be understood as a limiting example.

FIG. 6A is a GUI example for Client login with username and password assigned by administrator. The figure shows an embodiment example of login to the user panel in a TMS Online services.

FIG. 6B shows a GUI example for the main menu of a user panel wherein Menu descriptions and their corresponding key features are "Tags": List of sensor labels, "Profiles": Create profiles and list of predefined profiles, "Limits": Create temperature limits and list of predefined temperature limits, "Reports": Generate reports with information concerning available tags, and "Logs": History of current user activities.

By selecting Tags in the main menu, the user may get a list of sensor labels registered on current client as illustrated in FIG. 6C. Color code may be used for highlighting sensor label status, wherein for example Light green means: "Sensor label is registered in database", White: "Profile is assigned to sensor label", Dark green: "Sensor label is profiled", Yellow: "Sensor label is started", Orange: "Sensor label is stopped", and Red: "Some error has occurred". Additionally can flags be used to state specific occurrences such as for example a Red flag: "Temperature limits are exceeded".

Before use, a profile may be assigned to the sensor label. Clients may be able to define their own profiles by products or different applications. A profile contains start time and log interval (time between each temperature measurement). The start time scheme may be: immediately after activation, delayed for a period (up to for example 9 hours), or postponed to a given date and time in the future, or other scheme. The profile may be transferred from the TMS Online services to the sensor label through a client application. Profiles are managed in this embodiment by selecting Profiles in main menu (see above).

In FIG. 7A-D, it is shown how to create a new profile. User may create and reuse profiles. The user may define delay before start and time intervals between each logged temperature measurement. Profiles may be created with static or dynamic delay and in this embodiment, it is possible to profile both NFC and UHF RFID tags or labels.

In FIG. 7C, the figure shows UHF RFID profile settings with 8 minutes and 53 seconds static delay, and 5 minutes time interval between each logged temperature measurement. After the sensor label receives a start command from the TMS client app, the sensor label will wait for the assigned delay before starting the temperature logging process. To start the sensor label immediately the static delay settings should be set to zero.

An alternative to static delay is dynamic delay as illustrated in FIG. 7D, which means that the sensor label is started on a future date and time. In this case, it may require that the sensor label receives a start command from TMS client app before the date and time occurs. If required, and no start command is received, the temperature log process won't start.

After a profile is created, it should be assigned to a client node in the database by selecting Assign to client node as shown in FIG. 8A in the profile view. Selecting Client nodes as shown in FIG. 8B to view the client node tree, and selecting the client node(s) as shown in FIG. 8C to which you will assign the profile.

In FIG. 9A-C it is illustrated an example GUI for tags view, for assigning a predefined profile to a sensor label.

Figures 9C, 10A:
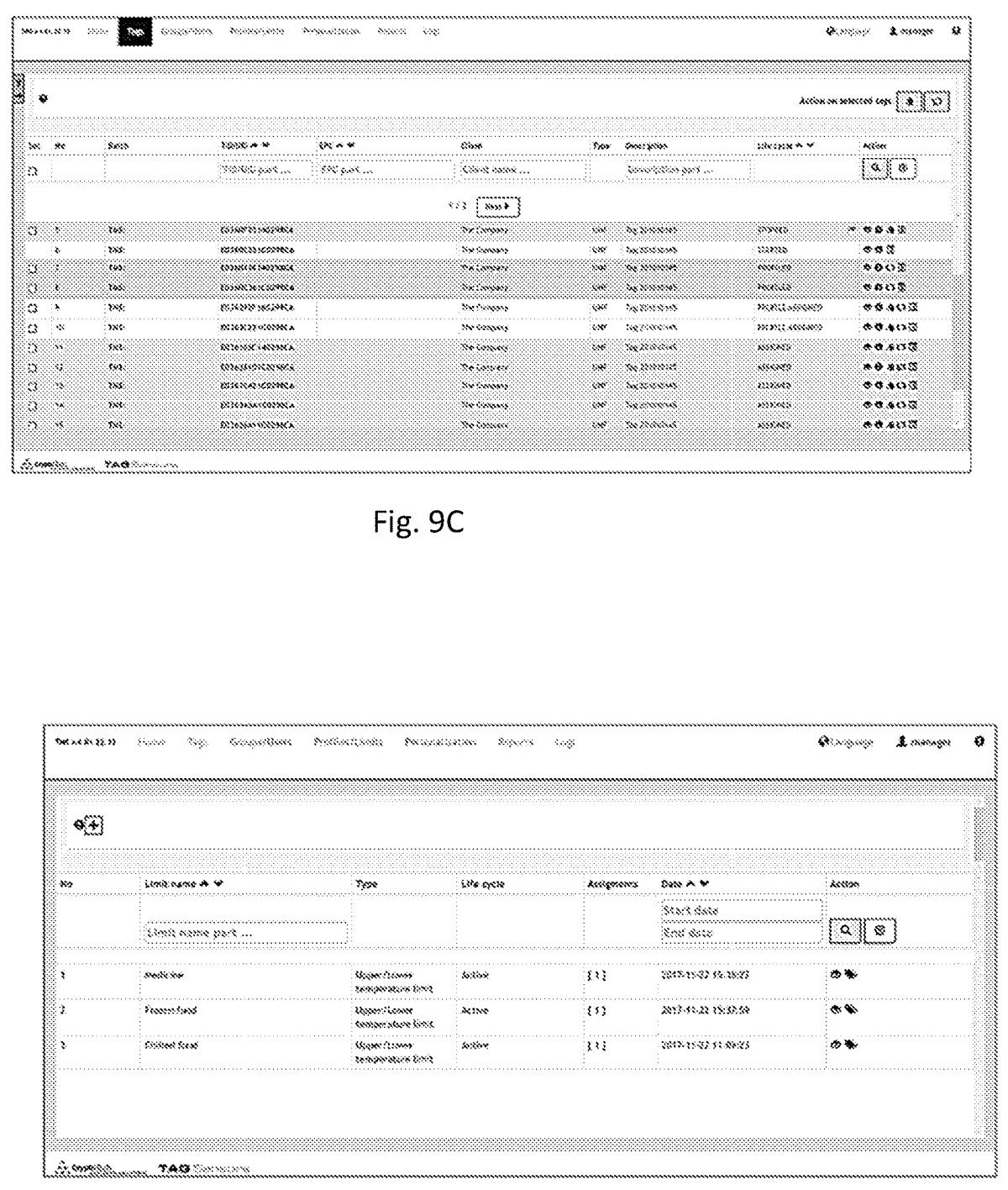

FIG. 9B illustrates an optional list of predefined profiles that can be selected, and FIG. 9C illustrates a list where some profiles are about to be assigned to sensor labels.

TMS Online services may monitor and compare the temperatures logs from the sensor labels with predefined temperature limits. The user may define temperature limits for different applications (e.g. products or product groups) as illustrated in FIG. 10 A-E. Temperature limits may be managed by selecting Limits in the main menu, and new temperature limits are created. Upper and lower temperature limits may be set in fields for upper and lower temperature limits.

Figures 10B, 10C:
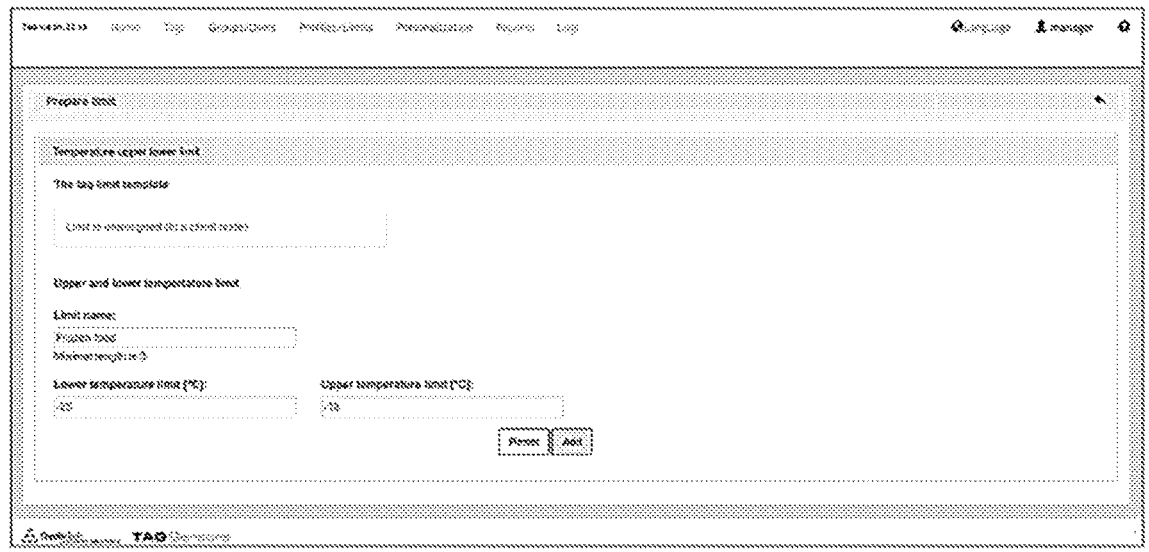
Figure 10D:
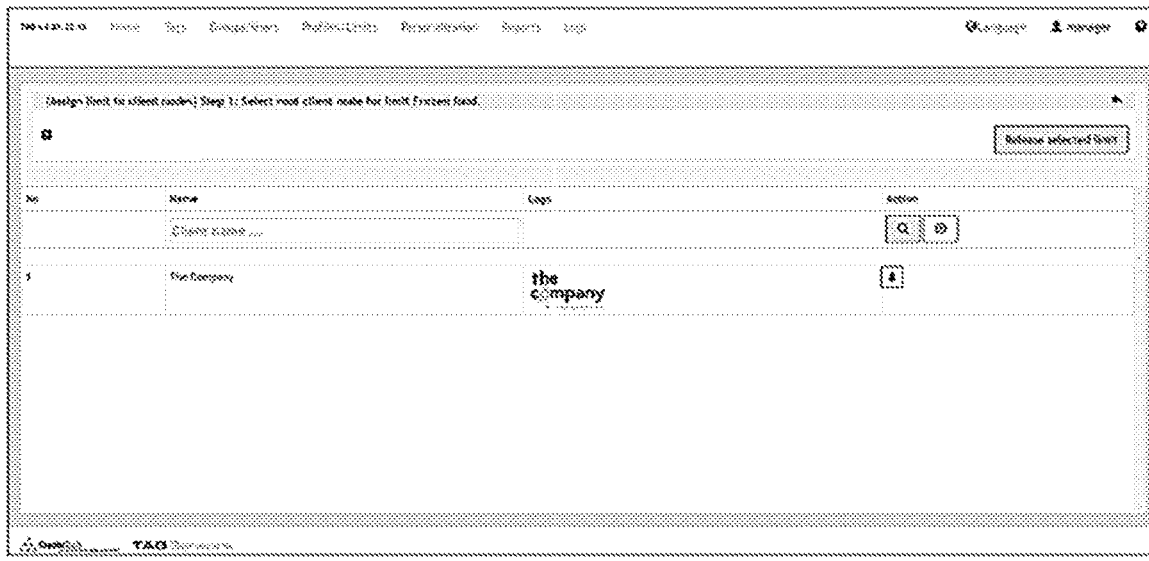
Figure 10E:
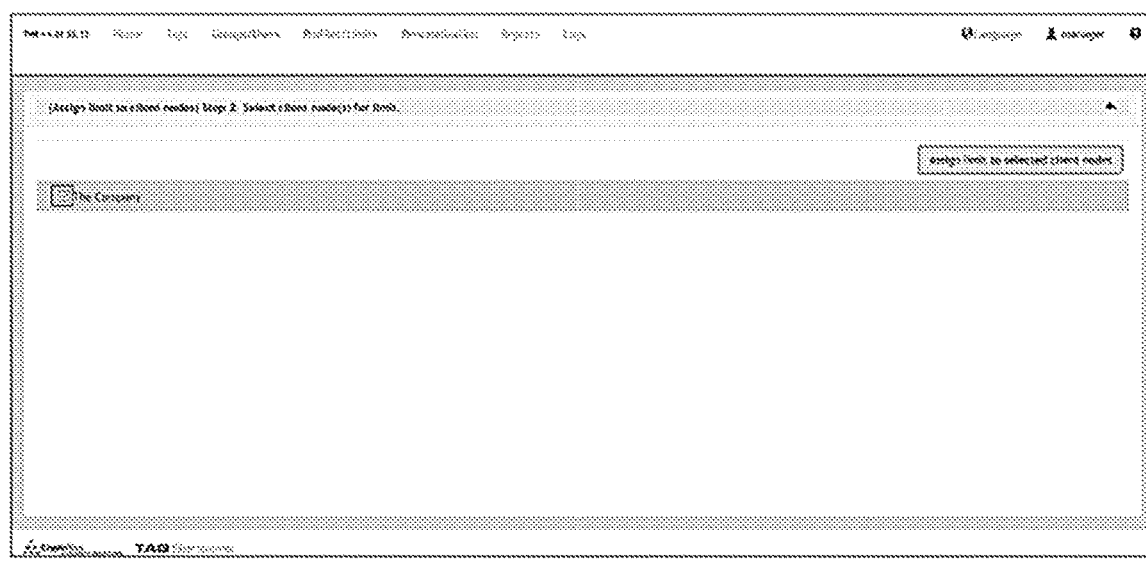

After a temperature limit is created, it should be assigned to the client node(s) s illustrated in FIG. 10C-E.

Figures 11A, 11B:
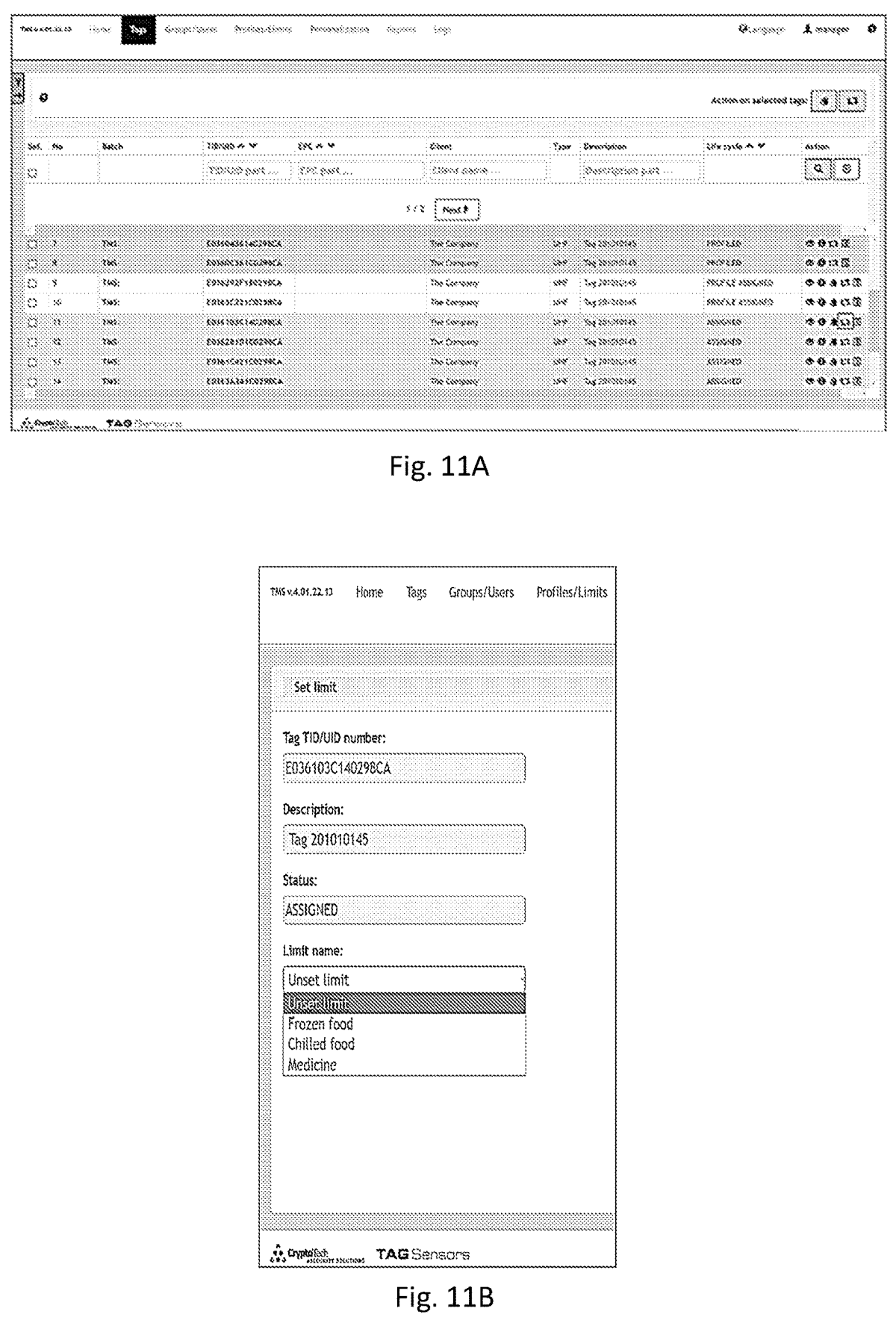

FIG. 11A-B illustrates selecting "Set limit" to set a predefined temperature limit on a sensor label. If the temperature limit already exists, it can be selected from the list of predefined limits as shown in FIG. 11B.

When temperature limits are set, it may be viewed, as illustrated in FIG. 12A, how temperature limits are set on a sensor label, choosing tag history.

In FIG. 12B it is shown an example of how the temperature limits are exceeded on the sensor labels in line 2-5 (=Red flag in the life cycle column).

In the Tags list of sensor labels, it is shown how newly assigned sensor labels are viewed at the bottom of the activity log as illustrated in FIG. 12C. The FIG. 12D shows all events in a sensor label life cycle.

A further option of illustrating the temperature activities are illustrated in FIG. 13A-C wherein selecting to view a temperature chart in FIG. 13A may proceed to display the temperature chart of the sensor label temperature data log as illustrated in FIG. 13B, where also the temperature limits are mapped into the table. FIG. 13C illustrate how the data set is illustrated in a table format.

Every time a sensor label is read by a device comprising geoposition data that is either hardcoded into the device or defined by navigation applications such as a satellite navigation application or the like, the sensor label data set may be supplemented with geoposition data. The geoposition data may be displayed such that the geoposition where the sensor label is started, read or stopped can be viewed in a map as illustrated in FIG. 14B. Export of temperature data log may be offered in a separate GUI window as illustrated in FIG. 14C.

The following figures illustrates how an implementation of a user application may be implemented on a mobile device, such as a smart phone or the like.

FIG. 15A: The user logs in with credentials assigned from the super user. The figure shows login to TMS client app.

After login, the sensor label is placed within the read range of the RFID antenna from the mobile device. If the sensor label is registered in TMS Online and a profile is assigned to it, the displayed message may be as illustrated in FIG. 15B. Selecting Profile will display the assigned profile as exemplified in illustration in FIG. 15C.

Select "Apply profile" to profile the sensor label with predefined start time and temperature log intervals. (By selecting "Erase memory", all previous temperature log points are erased from the sensor label). Display as shown in FIG. 15D is displayed when a sensor label is profiled but not yet started.

The down arrow will display additional information such as battery capacity and ambient temperature, illustrated in FIG. 15E.

By selecting "Start", the real time clock in the sensor label may start and the temperature measurement process may be performed according to the predefined profile. The geoposition of the start event may be stored in the TMS Online database.

By selecting "Read" in TMS client app the TMS Online database is updated with temperature log and optionally the geoposition, and the temperature log may be displayed graphically in the TMS client app, and selecting "Show table" displays the temperature log in table view, as illustrated in FIGS. 16A and 16B.

After the measurement period has ended, the sensor label can be stopped by selecting "Stop". TMS Online database is updated with temperature log and optionally geoposition, see FIG. 16C.

The foregoing description of the aspects, including illustrated aspects, of the invention has been presented only for the purpose of illustration and description and is not intended to be exhaustive or to limit the invention to the precise forms disclosed. Numerous modifications, adaptations, and uses thereof will be apparent to those skilled in the art without departing from the scope of this invention.

The invention shall also be recognized by the following advantageous system embodiments where there is in a first system embodiment a system for monitoring, tracking, and reporting the temperature chain of a product under transport or storage, the system comprising: Sensor label comprising temperature sensor, sensor label processor means, sensor label storage and sensor label communication means, Computing means comprising communication means, processing means and storage means, wherein the sensor label storage means comprise storage capacity for one or more measurements made by the temperature sensor and the sensor label processing means being configured to control the measurements, and the sensor label communication means comprise features for communicating configuration settings for the sensor label processing means configuration.

A second system embodiment for monitoring, tracking, and reporting the temperature chain of a product under transport or storage according to the first system embodiment, wherein the sensor label communication means further comprise features for communicating temperature readings from the sensor label to the computing means.

A third system embodiment for monitoring, tracking, and reporting the temperature chain of a product under transport or storage according to the first or second system embodiment, wherein the computing means communication means comprise a front end computing means enabled to communicate directly with the sensor label communication means and a back end computing means for storage and handling information sent to and received from the sensor label, and wherein the front end computing means and the back end computing means communicate over a wired or wireless communication protocol.

A fourth system embodiment for monitoring, tracking, and reporting the temperature chain of a product under transport or storage according to the third system embodiment, wherein the back end computing means comprise a cloud based storage and database services.

A fifth system embodiment for monitoring, tracking, and reporting the temperature chain of a product under transport or storage according to any of the first to fourth system embodiment, wherein the sensor label communication means and processing means are provided by an RFID chip and an RFID antenna, and the sensor label communication means are able to communicate over UHF or HF RFID communication protocol.

A sixth system embodiment for monitoring, tracking, and reporting the temperature chain of a product under transport or storage according to the fifth system embodiment, wherein the HF RFID communication protocol is an NFC communication protocol.

A seventh system embodiment for monitoring, tracking, and reporting the temperature chain of a product under transport or storage according to the third system embodiment, wherein the front end computing means is an RFID reader.

The invention shall also be recognized by the following advantageous embodiments where there is in a first device embodiment for monitoring, and tracking the temperature chain of a product under transport or storage, the device comprising:
a microchip 22, the microchip comprising a temperature sensor, memory and clock, and the device further comprising a battery 23, and antenna 21.

A second device embodiment of the device for monitoring, and tracking the temperature chain of a product under transport or storage according to the first device embodiment, wherein the microchip 22 is a UHF RFID 22.

A second device embodiment of the device for monitoring, and tracking the temperature chain of a product under transport or storage according to the first or second device embodiment, wherein the microchip comprise a communication module able to communicate with a remote processing unit 4,11,24.

The invention shall also be recognized by the following advantageous method embodiments where there is in a first method embodiment a method for monitoring, tracking, and reporting the temperature chain of a product under transport or storage, the method comprising the following steps:
configuring the device according to one of claims 8 to 10 with a temperature sensor operation regime, initiating a transport session to start temperature reading according to temperature sensor operation regime,
execute readings according to temperature sensor operation regime,
transmitting temperature readings to device reader
stopping temperature reading.

A second method embodiment for monitoring, tracking, and reporting the temperature chain of a product under transport or storage according to the first method embodiment, comprising the further steps:
creating an intermediate temperature log after a reading or final temperature log when temperature reading are stopped.

A further first sensor label 20 for monitoring, and tracking the temperature chain of a product under transport or storage, the sensor label comprising a configurable microchip 22, the microchip comprising a temperature sensor, memory and clock, the device further comprising a battery 23, and antenna 21, and wherein the microchip is configured to read the temperature sensor at a configurable time interval.

A further second sensor label 20 according to the further first sensor label 20, wherein the microchip 22 is one of an RFID tag, an NFC tag, or a label or card able to exchange data with a reader using radio frequency signals.

A further third sensor label 20 according to the further first or second sensor label 20, wherein the sensor label 20 has a first printable surface and a second adhesive back surface with release paper.

A further fourth sensor label 20 according to any of the further first to third sensor label 20, having a total height of less than 3 mm, or even as low as 1.3 mm, 0.8 mm, 0.3 mm or thinner.

A further fifth sensor label 20 according to any of the further first to fourth sensor label 20,wherein two or more sensor labels 20 are arranged on an accordion style strip 20'.

A further first sensor label feeder 170, comprising a feeder box 170', the feeder box 170' having at least a floor, to sides and a back wall, a feed ledge 193, and a connector plate 191, wherein the connector plate 191 is provided with a connector plate slot 192 through which a sensor label strip 20' may be fed.

A further second sensor label feeder 170 according to the further first sensor label feeder 170, wherein the connector plate 191 is provided with a connector plate slot 192 through which a sensor label strip 20' may be fed.

A further third sensor label feeder 170 according to the further first or second sensor label feeder 170, wherein the feeder box 170' comprising one or more pairs of friction strips 196, wherein each strip in a pair 196 are horizontally arranged opposite each other, on the inside of the side walls of the feeder box 170', for holding back a folded reservoir of accordion style strip 20' when loaded in the feeder box 170'.

A further fourth sensor label feeder 170 according to any one of the further first to third sensor label feeder 170, wherein the feeder box 170' comprising two pairs of friction strips 196.

A further fifth sensor label feeder 170 according to any one of the further first to fourth sensor label feeder 170, wherein the connector plate 191 comprise fastening means 194 for connecting the sensor label feeder 170 to a printer.

A further sixth sensor label feeder 170 according to the further fifth sensor label feeder 170, wherein the fastening means 194 is comprised of 1 or more magnets.

A further first label printer 25, comprising: a programming unit 180 for wireless configuration of a sensor label 20 according to claims 1 to 5, a metal feeder board 171 arranged inside the label printer stretching from above and behind the programming unit 180 and towards the back wall of the printer in a manner such that a strip of sensor labels 20' inside the printer is lead towards and over the programming unit, and only the sensor label 20 in a position directly above the programming unit/reader 180 is not supported by the metal feeder board 171, and a slot 173 in the printer 25 back wall, aligned with the level of the metal feeder board 171, for allowing single height sensor labels 20 to be fed into the printer.

A further second label printer 25, according to the further first label printer 25, further comprising a sensor label feeder 170 according to claims 6 to 11, wherein a sensor label strip 20' according to claim 5 is comprised in the sensor label feeder and led into the printer via the slot 173 and onto the metal feeder board.

A further first system for configuring a sensor label 20, the system comprising: a sensor label management system 1, a sensor label 20 according to any one of the further first to fifth sensor label 20, a computer resource 24, and a label printer 25 according to any one of the further first to second label printer 25.

A further second system according to the further first system for configuring a sensor label 20, further comprising a sensor label feeder 170 according to any one of the further first to sixth sensor label feeder 170.

A further third system for monitoring, tracking, and reporting the temperature chain of a product under transport or storage, the system comprising: sensor label 20 according to any one of the further first to fifth sensor label 20, computing means 4, 11, 24, 31 comprising communication means, processing means and storage means, the sensor label memory comprise storage capacity for one or more measurements made by the sensor label temperature sensor, the sensor label processing means being configured to control the sensor label temperature sensor measurements, and the sensor label communication means comprise features for communicating configuration settings for the sensor label processing means configuration.

A further fourth system according to the further third system for monitoring, tracking, and reporting the temperature chain of a product under transport or storage, wherein the sensor label communication means further comprise features for communicating temperature readings from the sensor label to the computing means 4, 11, 24, 31.

A further fifth system according to the further third or fourth system for monitoring, tracking, and reporting the temperature chain of a product under transport or storage, wherein the computing means communication means comprise a front end computing means enabled to communicate directly with the sensor label communication means and a back end computing means for storage and handling information sent to and received from the sensor label, and wherein the front end computing means 4, 11, 24, 31 and the back end computing means 1 communicate over a wired or wireless communication protocol.

A further sixth system according to the further fifth system for monitoring, tracking, and reporting the temperature chain of a product under transport or storage, wherein the back end computing means comprise a cloud based storage and database services.

A further seventh system according to the further third to sixth system for monitoring, tracking, and reporting the temperature chain of a product under transport or storage, wherein the sensor label communication means and processing means are provided by an RFID chip and an RFID antenna, and the sensor label communication means are able to communicate over UHF or HF RFID communication protocol.

A further eight system according to the further third to sixth system for monitoring, tracking, and reporting the temperature chain of a product under transport or storage, wherein the sensor label communication means and processing means are provided by an NFC chip, and the sensor label communication means are able to communicate over an NFC communication protocol.

A further ninth system according to the further fifth system for monitoring, tracking, and reporting the temperature chain of a product under transport or storage, wherein the front end computing means is an RFID reader.

A further first method for configuring a sensor label 20 comprising the following steps: providing a label printer 25 according to any one of the further first to second label printer 25, providing a sensor label 20 according to any one of the further first to fifth sensor label 20, initiating a sensor label 20 initialization and printing session 202 by connecting the printer 25 to a local computer resource 24, the local computer resource 24 routine receiving configuration data 230 from a remote computer or a cloud service or server 1, 200, setting reader power of the programming unit 180 to a minimum power setting 205, the programming unit 180 sending an inventory scan 206 to the sensor label 20, and stepwise increasing reader power until an acceptable response from sensor label is received.

A further second method according to the further first method for configuring a sensor label 20, wherein the inventory scan 206 is in the form of a request for an EPCID.

A further third method according to any one of the further first or second method for configuring a sensor label 20, further comprising one or more of following steps wherein the programming unit 180: testing if TID (Tag ID number) of the sensor unit 20 can be read 212, testing if user memory of the sensor unit 20 can be read 213, testing if user memory of the sensor unit 20 can be written 214, testing if EPC (Electronic Product Code) of the sensor unit 20 can be written 215, testing if temperature sensor of the sensor unit 20 can be read 216, testing if the battery voltage of the sensor unit 20 can be read 217, and if any of the tests returns with an invalid result 218 the increasing the power setting further 211 and repeat the failed tests.

A further fourth method according to any one of the further first to third method for configuring a sensor label 20, further comprising the following steps: downloading sensor label profile 219, writing the profile/settings to the sensor label 20.

A further fifth method according to the further fourth method for configuring a sensor label 20, further comprising the step: downloading from the remote computer or a cloud service or server 1, 200 the graphical presentation defined for the sensor label to the printer 224, printing 225 the defined graphical presentation to the printing surface of the sensor label, such that the sensor label 20 may then be attached 226 to the goods to be monitored/temperature logged.

A further sixth method for monitoring, tracking, and reporting the temperature chain of a product under transport or storage, the method comprising the following steps: configuring a sensor label 20 according to any one of the further first to fifth sensor label 20 with a temperature sensor operation regime, initiating a transport session to start temperature reading according to temperature sensor operation regime, execute readings according to temperature sensor operation regime, transmitting temperature readings to device reader 4, 11, 24, 31, stopping temperature reading.

A further seventh method according to the further sixth method for monitoring, tracking, and reporting the temperature chain of a product under transport or storage, comprising the further steps: creating an intermediate temperature log after a reading or final temperature log when temperature reading are stopped.

A further eighth method according to any one of the further sixth or seventh method for monitoring, tracking, and reporting the temperature chain of a product under transport or storage, wherein the sensor operation regime comprise:
 a start time where temperature logging starts immediately after initialization, after a predefined time elapse, or at a defined date and time,
 logging time interval defined to be between every second to every 9 hour.

The foregoing description of the aspects, including illustrated aspects, of the invention has been presented only for the purpose of illustration and description and is not intended to be exhaustive or to limit the invention to the precise forms disclosed. Numerous modifications, adaptations, and uses thereof will be apparent to those skilled in the art without departing from the scope of this invention.

The invention claimed is:

1. A label printer, comprising:
   a programming unit for wireless configuration of a sensor label,
   a metal feeder board arranged inside the label printer stretching from above and behind the programming unit and towards the back wall of the printer in a manner such that a strip of sensor labels inside the printer is lead towards and over the programming unit, and only the sensor label in a position directly above the programming unit/reader is not supported by the metal feeder board, and
   a slot in the printer back wall, aligned with the level of the metal feeder board, for allowing single height sensor labels to be fed into the printer.

2. The label printer, according to claim 1, further comprising a sensor label feeder comprising a feeder box, the feeder box having at least a floor, to sides and a back wall,
   a feed ledge, and
   a connector plate, wherein the connector plate is provided with a connector plate slot through which a sensor label strip may be fed, wherein a sensor label strip is comprised in the sensor label feeder and led into the printer via the slot and onto the metal feeder board.

3. A system for configuring a sensor label, the system comprising:
   a sensor label management system,
   a sensor label,
   a computer resource, and
   a label printer comprising
      a programming unit for wireless configuration of a sensor label,
      a metal feeder board arranged inside the label printer stretching from above and behind the programming unit and towards the back wall of the printer in a manner such that a strip of sensor labels inside the printer is lead towards and over the programming unit, and only the sensor label in a position directly above the programming unit/reader is not supported by the metal feeder board, and
      a slot in the printer back wall, aligned with the level of the metal feeder board, for allowing single height sensor labels to be fed into the printer.

4. The system according to claim 3, further comprising a sensor label feeder comprising a feeder box , the feeder box having at least a floor, to sides and a back wall,
   a feed ledge, and
   a connector plate, wherein the connector plate is provided with a connector plate slot through which a sensor label strip may be fed.

* * * * *